US012744255B2

(12) United States Patent
Xu et al.

(10) Patent No.: US 12,744,255 B2
(45) Date of Patent: Sep. 22, 2026

(54) SECONDARY BATTERY, ELECTRICAL APPARATUS, AND APPLICATION OF SILICATE MULTI-METAL SALT

(71) Applicant: CONTEMPORARY AMPEREX TECHNOLOGY (HONG KONG) LIMITED, Hong Kong (CN)

(72) Inventors: Ningbo Xu, Ningde (CN); Hailin Zou, Ningde (CN); Peipei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 87 days.

(21) Appl. No.: 18/937,729

(22) Filed: Nov. 5, 2024

(65) Prior Publication Data

US 2025/0062421 A1 Feb. 20, 2025

Related U.S. Application Data

(63) Continuation of application No. PCT/CN2022/123228, filed on Sep. 30, 2022.

(51) Int. Cl.
*H01M 4/62* (2006.01)
*H01M 4/131* (2010.01)
(Continued)

(52) U.S. Cl.
CPC ....... *H01M 10/4235* (2013.01); *H01M 4/131* (2013.01); *H01M 4/133* (2013.01); *H01M 4/136* (2013.01); *H01M 4/1391* (2013.01); *H01M 4/1393* (2013.01); *H01M 4/1397* (2013.01); *H01M 4/62* (2013.01);
(Continued)

(58) Field of Classification Search
None
See application file for complete search history.

(56) References Cited

U.S. PATENT DOCUMENTS

2007/0166620 A1 7/2007 Issaev et al.
2021/0167367 A1 6/2021 Uchiyama et al.

FOREIGN PATENT DOCUMENTS

CN 1282117 A 1/2001
CN 106532118 A 3/2017
(Continued)

OTHER PUBLICATIONS

JP-7116518-B1 (Year: 2022).*
(Continued)

*Primary Examiner* — Tracy M Dove
(74) *Attorney, Agent, or Firm* — Ladas & Parry LLP

(57) ABSTRACT

A secondary battery in which at least one of a positive electrode active material layer and a negative electrode active material layer includes a silicate multi-metal salt is disclosed. A chemical formula of the silicate multi-metal salt is at least one selected from $YSi_2Z^1Z^2O_8$ and $X^1X^2Si_2Z^1Z^2O_8$, Y is selected from second main group elements, $X^1$ and $X^2$ are each independently selected from first main group elements, and $Z^1$ and $Z^2$ are each selected from third main group elements.

20 Claims, 2 Drawing Sheets

(51) Int. Cl.

| | |
|---|---|
| ***H01M 4/133*** | (2010.01) |
| ***H01M 4/136*** | (2010.01) |
| ***H01M 4/1391*** | (2010.01) |
| ***H01M 4/1393*** | (2010.01) |
| ***H01M 4/1397*** | (2010.01) |
| ***H01M 10/0525*** | (2010.01) |
| ***H01M 10/42*** | (2006.01) |
| *H01M 4/02* | (2006.01) |

(52) U.S. Cl.

CPC .. *H01M 10/0525* (2013.01); *H01M 2004/027* (2013.01); *H01M 2004/028* (2013.01); *H01M 2220/20* (2013.01)

(56) References Cited

FOREIGN PATENT DOCUMENTS

| | | | | | |
|---|---|---|---|---|---|
| CN | 108767318 A | | 11/2018 | |
| CN | 111769327 A | | 10/2020 | |
| CN | 112670471 A | | 4/2021 | |
| CN | 113113731 A | * | 7/2021 | ........ H01M 10/4235 |
| CN | 113707883 A | | 11/2021 | |
| CN | 113875049 A | | 12/2021 | |
| CN | 114520318 A | | 5/2022 | |
| CN | 114730910 A | | 7/2022 | |
| CN | 114743805 A | | 7/2022 | |
| CN | 117678090 A | * | 3/2024 | .......... H01M 10/054 |
| JP | 2023128118 A | | 9/2023 | |
| WO | WO 2004000546 A1 | | 12/2003 | |
| WO | WO-2024065662 A1 | * | 4/2024 | ............. H01M 4/13 |

OTHER PUBLICATIONS

Extended European Search Report from EP patent application No. 22960284.2, mailed Mar. 27, 2025.

Notice of Decision of Granting Patent Right for Utility Model in Chinese Application No. 202280088190.X, issued on Nov. 19, 2025.

ISR for International Application PCT/CN2022/123228 mailed Jun. 1, 2023.

Written Opinion for International Application PCT/CN2022/123228 mailed Jun. 1, 2023.

* cited by examiner

SECONDARY BATTERY, ELECTRICAL APPARATUS, AND APPLICATION OF SILICATE MULTI-METAL SALT

CROSS-REFERENCE TO RELATED APPLICATIONS

This application is a continuation of International application PCT/CN2022/123228 filed on Sep. 30, 2022, the subject matter of which is incorporated herein in its entirety.

TECHNICAL FIELD

This application relates to the technical field of secondary batteries, and in particular, to a secondary battery, an electrical apparatus, and application of a silicate multi-metal salt.

BACKGROUND

The statements herein provide only background information relevant to this application and do not necessarily constitute a conventional technology.

With the accelerated pace of life and the popularization and development of various electronic products such as smartphones, tablet computers, smart wearables, electric tools, and electric vehicles, the electronic products carry more and more functions and become more diversified. In this way, usage time of the electronic products in people's lives becomes longer, which poses a higher challenge to service lives of the electronic products.

Therefore, it is urgent to further prolong the service lives of the secondary battery products.

SUMMARY

In view of the above problems, this application provides a secondary battery, an electrical apparatus, and application of a silicate multi-metal salt. The silicate multi-metal salt is used as an interfacial stabilizer in an electrode plate of the secondary battery, which can improve infiltration performance of an electrolytic solution, stabilize an electrode-electrolytic solution interface, improve cycle performance, and prolong the service life of the battery.

According to a first aspect, this application provides a secondary battery, including a positive electrode plate, a negative electrode plate, a separator, and an electrolytic solution, where the separator is located between the positive electrode plate and the negative electrode plate, the positive electrode plate includes a positive electrode active material layer, and the negative electrode plate includes a negative electrode active material layer;

at least one of the positive electrode active material layer and the negative electrode active material layer includes a silicate multi-metal salt; and a chemical formula of the silicate multi-metal salt is at least one selected from $YSi_2Z^1Z^2O_8$ and $X^1X^2Si_2Z^1Z^2O_8$;

where

Y is selected from second main group elements;

$X^1$ and $X^2$ are each independently selected from first main group elements; and $Z^1$ and $Z^2$ are each selected from third main group elements.

The special silicate multi-metal salt is used as an interfacial stabilizer in an electrode plate of the secondary battery, which can improve infiltration performance of an electrolytic solution, stabilize an electrode-electrolytic solution interface, improve cycle performance, and prolong the service life of the battery. The silicate multi-metal salt in this application includes specific short-period main group I to III elements, and these short-period main group elements can participate in formation of an electrolyte interfacial film. The silicate multi-metal salt in this application can be used as an interfacial stabilizer to improve the infiltration performance of the electrolytic solution, stabilize the electrode-electrolytic solution interface, improve the cycle performance and storage performance of the secondary battery, and prolong the service life of the secondary battery. The silicate multi-metal salt can stabilize both a cathode electrolyte interface (CEI) and a solid electrolyte interface (SEI). By contrast, main group IV to VII elements have weak force with an element oxygen or include many lone pair electrons and are prone to an oxidation reaction. In addition, long period sub-group elements have many virtual orbitals that catalyze a redox reaction of the electrolytic solution.

In some implementations of this application, a structural formula of the silicate multi-metal salt is at least one selected from Formula I and Formula II:

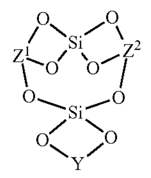

I

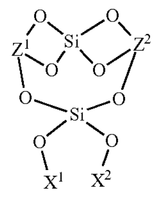

II

In some implementations of this application, the secondary battery satisfies any one or more of the following characteristics:

Y is Mg or Be;

$X^1$ and $X^2$ are each independently Li or Na;

$X^1$ and $X^2$ are the same in an identical molecule;

$Z^1$ and $Z^2$ are each independently Al or B; and $Z^1$ and $Z^2$ are the same in an identical molecule.

In some implementations of this application, the silicate multi-metal salt is selected from one or more of magnesium aluminum silicate, magnesium boron silicate, beryllium aluminum silicate, beryllium boron silicate, lithium aluminum silicate, lithium boron silicate, sodium aluminum silicate, and sodium boron silicate.

A plurality of silicate multi-metal salts used in this application have excellent three-dimensional spatial structures, and have excellent physicochemical properties in one or more of the following aspects: spreadability, viscosity increase, film-forming assistance, thickening, rheology, thixotropy, suspension, colloidal thixotropy, a function of an emulsification stabilizer, and the like. Adding the special silicate multi-metal salt to the active material layer of the electrode plate is conducive to improving the infiltration performance of the electrolytic solution and stabilizing the electrode-electrolytic solution interface. In addition, the silicate multi-metal salt of this application also has certain alkalinity, and can remove acidic substances in the electrolytic solution and inhibit destruction of an interfacial structure by hydrofluoric acid (HF) and the like.

For example, the magnesium aluminum silicate has a unique three-dimensional spatial chain structure and a special needle-stick crystal structure. Therefore, the magnesium aluminum silicate has special colloidal and adsorption performance, and also has excellent performance in aspects such as thickening, suspension, and colloidal thixotropy, so that a "card house" type of association network structure can be formed in an aqueous medium. The magnesium aluminum silicate has specific spreadability, and can play a role in viscosity increase and film-forming assistance, thereby improving infiltration performance of the electrolytic solution in an electrode interface. The magnesium aluminum silicate also has certain viscosity, can cover a positive electrode active material interface or a negative electrode active material interface like a glue, and can also improve stability of decomposition products of an electrolytic solution additive (such as carbonate or other additives) in the electrolytic solution interface. Therefore, the magnesium aluminum silicate can improve the infiltration performance of the electrolytic solution, and stabilize the electrode-electrolytic solution interface. The magnesium aluminum silicate also has certain alkalinity, and can remove acidic substances in the electrolytic solution and inhibit destruction of an interfacial structure by HF and the like.

In some implementations of this application, the positive electrode active material layer includes a positive electrode active substance and the silicate multi-metal salt; and

- optionally, the positive electrode active material layer satisfies one or more of the following characteristics:
- in the positive electrode active material layer, a mass percentage of the silicate multi-metal salt relative to the positive electrode active substance is selected from 0.001% to 2%; optionally, the mass percentage of the silicate multi-metal salt relative to the positive electrode active substance is selected from 0.01% to 2%; optionally, the mass percentage of the silicate multi-metal salt relative to the positive electrode active substance is selected from 0.1% to 2%;
- in the positive electrode active material layer, a ratio of a mass of the silicate multi-metal salt relative to a specific surface area of the positive electrode active substance is selected from 0.01 $mg/m^2$ to 100 $mg/m^2$; optionally, the ratio of the mass of the silicate multi-metal salt relative to the specific surface area of the positive electrode active substance is selected from 0.1 $mg/m^2$ to 30 $mg/m^2$;
- a surface density of the silicate multi-metal salt in the positive electrode plate is selected from 0.001 $g/cm^2$ to 0.5 $g/cm^2$; optionally, the surface density of the silicate multi-metal salt in the positive electrode plate is selected from 0.01 $g/cm^2$ to 0.1 $g/cm^2$; and
- the positive electrode plate includes a CEI film, the CEI film is located on a surface on a side of the positive electrode active material layer away from a positive electrode current collector, and the CEI film includes the silicate multi-metal salt.

Adding the silicate multi-metal salt of this application to the positive electrode active material layer of the positive electrode plate is conducive to reducing deterioration of impedance in a cycling process, improving stability of the cathode electrolyte interface (CEI), and improving a cycle capacity retention rate, so that cycle stability and capacity usage of a battery cell can be improved to some extent.

In the positive electrode active material layer, when an addition amount of the silicate multi-metal salt is relatively small, dispersion evenness of the silicate multi-metal salt on a surface of the positive electrode material is reduced, which affects full protection effect for the CEI; and when an addition amount of the silicate multi-metal salt is relatively high, too much silicate multi-metal salt may be enriched at the interface of the positive electrode material, because the silicate multi-metal salt has a poor conductive ability, a large interface internal resistance may be generated and performance of the battery cell is deteriorated.

In some implementations of this application, the secondary battery is a lithium-ion secondary battery or a sodium-ion secondary battery.

In some implementations of this application, the positive electrode active substance includes a lithium-ion material; and

- optionally, the lithium-ion material includes at least one of a lithium-containing phosphate and a lithium transition metal oxide.

The lithium-ion secondary battery and the sodium-ion secondary battery are similar in basic principles and electrochemical reaction properties, and both utilize intercalation and deintercalation of active ions at electrodes and transmission in an electrolyte to implement charging and discharging processes. Generally speaking, the active ion in the lithium-ion secondary battery is a lithium ion, and the active ion in the sodium-ion secondary battery is a sodium ion, but this is not limited thereto. The silicate multi-metal salt in this application can be used to optimize performance of both the lithium-ion secondary battery and the sodium-ion secondary battery. In both secondary battery systems, the silicate multi-metal salt can improve the infiltration performance of the electrolytic solution, stabilize the electrode-electrolytic solution interface, improve cycle performance and storage performance of the secondary batteries, and prolong the service lives of the secondary batteries. In addition, the silicate multi-metal salt in this application can stabilize the electrode-electrolytic solution interface and improve the performance of the battery cell in a plurality of secondary batteries including different types of positive electrode active substances.

The positive electrode active substance may be selected from materials that can have a volume change in a process of deintercalation and intercalation of active ions (such as lithium ions, sodium ions, or potassium ions) and whose active material interface has a catalytic effect on the electrolytic solution.

In some implementations of this application, the negative electrode active material layer includes a negative electrode active substance and the silicate multi-metal salt; and

- optionally, the negative electrode active material layer satisfies one or more of the following characteristics:
- in the negative electrode active material layer, a mass percentage of the silicate multi-metal salt relative to the negative electrode active substance is selected from 0.005% to 5%; optionally, the mass percentage of the silicate multi-metal salt relative to the negative electrode active substance is selected from 0.02% to 3%; and optionally, the mass percentage of the silicate multi-metal salt relative to the negative electrode active substance is selected from 0.1% to 3%;
- in the negative electrode active material layer, a ratio of a mass of the silicate multi-metal salt relative to a specific surface area of the negative electrode active substance is selected from 0.01 $mg/m^2$ to 100 $mg/m^2$; optionally, the ratio of the mass of the silicate multi-metal salt relative to the specific surface area of the negative electrode active substance is selected from 0.1 $mg/m^2$ to 30 $mg/m^2$;

a surface density of the silicate multi-metal salt in the negative electrode plate is selected from 0.0005 $g/cm^2$ to 0.5 $g/cm^2$; optionally, the surface density of the silicate multi-metal salt in the negative electrode plate is selected from 0.001 $g/cm^2$ to 0.3 $g/cm^2$; and the negative electrode plate includes an SEI film, the SEI film is located on a surface on a side of the negative electrode active material layer away from a negative electrode current collector, and the SEI film includes the silicate multi-metal salt.

Adding the silicate multi-metal salt of this application to the negative electrode active material layer is also conducive to reducing deterioration of impedance in a cycling process, improving stability of the solid electrolyte interface (SEI), and improving a cycle capacity retention rate, so that cycle stability and capacity usage of the battery cell can be improved to some extent.

In the negative electrode active material layer, when an addition amount of the silicate multi-metal salt is relatively small, dispersion evenness of the silicate multi-metal salt on a surface of the negative electrode material is reduced, which affects full protection effect for the interface; and when an addition amount of the silicate multi-metal salt is relatively high, too much silicate multi-metal salt is easily enriched at the interface of the material, because the silicate multi-metal salt has a poor conductive ability, a large interface internal resistance is easily generated and performance of the battery cell is deteriorated.

In some implementations of this application, the secondary battery is a lithium-ion battery, and the negative electrode active substance includes graphite;

optionally, a mass percentage of the graphite in the negative electrode active substance is greater than 50%;

optionally, a mass percentage of the graphite in the negative electrode active substance is selected from 70% to 100%;

optionally, a mass percentage of the graphite in the negative electrode active substance is selected from 80% to 100%;

optionally, a mass percentage of the graphite in the negative electrode active substance is selected from 90% to 100%; and optionally, a mass percentage of the graphite in the negative electrode active substance is 100%.

In some implementations of this application, the secondary battery is a lithium-ion battery, and the negative electrode active substance includes a silicon-carbon complex;

optionally, a mass percentage of the silicon-carbon complex in the negative electrode active substance is greater than 50%;

optionally, a mass percentage of the silicon-carbon complex in the negative electrode active substance is selected from 70% to 100%;

optionally, a mass percentage of the silicon-carbon complex in the negative electrode active substance is selected from 80% to 100%;

optionally, a mass percentage of the silicon-carbon complex in the negative electrode active substance is selected from 90% to 100%; and optionally, a mass percentage of the silicon-carbon complex in the negative electrode active substance is 100%.

The silicate multi-metal salt of this application may be used to improve performance such as electrode-electrolytic solution interface stability and cycle capacities of a plurality of secondary batteries. Applicable secondary batteries may include, but are not limited to, currently existing lithium-ion secondary batteries. Some non-limitative examples are the foregoing lithium-ion battery in which the negative electrode active substance includes the graphite, lithium-ion battery in which the negative electrode active substance includes the silicon-carbon complex, and the like.

In the active material layer of the electrode plate, when an addition amount of the silicate multi-metal salt is relatively small, dispersion evenness of the silicate multi-metal salt on a surface of the electrode plate material is reduced, which affects full protection effect for the interface; and when an addition amount of the silicate multi-metal salt is relatively high, too much silicate multi-metal salt is easily enriched at the interface of the electrode plate material, because the silicate multi-metal salt has a poor conductive ability, a large interface internal resistance is easily generated and performance of the battery cell is deteriorated.

According to a second aspect, an electrical apparatus is provided, and includes the secondary battery according to the first aspect of this application.

Use of the secondary battery in the first aspect of this application in the electrical apparatus can utilize an interface stabilization effect of the foregoing special silicate multi-metal salt to improve the cycle performance and prolong the service life.

According to a third aspect, an application of a silicate multi-metal salt in preparation of a secondary battery is provided, where the silicate multi-metal salt is as defined in the first aspect of this application;

the application includes at least one of preparation of a positive electrode plate including the silicate multi-metal salt and preparation of a negative electrode plate including the silicate multi-metal salt;

optionally, the application includes the preparation of the positive electrode plate including the silicate multi-metal salt;

optionally, the application includes the preparation of the negative electrode plate including the silicate multi-metal salt; and optionally, the application includes the preparation of the positive electrode plate including the silicate multi-metal salt and the preparation of the negative electrode plate including the silicate multi-metal salt.

The foregoing special silicate multi-metal salt is used to prepare the secondary battery (including but not limited to the secondary battery described in the first aspect of this application). The silicate multi-metal salt can improve infiltration performance of an electrolytic solution, increase electrode-electrolytic solution interface stability, improve a battery cycle capacity, and extend use of the battery.

In some implementations of this application, the preparation of the positive electrode plate including the silicate multi-metal salt includes: coating at least one surface of a positive electrode current collector with a positive electrode slurry, drying, and compacting, where the positive electrode slurry includes a positive electrode active substance, the silicate multi-metal salt, a conductive agent, a binder, and a solvent;

optionally, in the positive electrode slurry, a mass percentage of the silicate multi-metal salt relative to the positive electrode active substance is selected from 0.001% to 2%; optionally, the mass percentage of the silicate multi-metal salt relative to the positive electrode active substance is selected from 0.01% to 2%; optionally, the mass percentage of the silicate multi-metal salt relative to the positive electrode active substance is selected from 0.1% to 2%;

optionally, in the positive electrode slurry, a ratio of a mass of the silicate multi-metal salt relative to a specific surface area of the positive electrode active substance is selected from 0.01 $mg/m^2$ to 100 $mg/m^2$; optionally, the ratio of the mass of the silicate multi-metal salt relative to the specific surface area of the positive electrode active substance is selected from 0.1 $mg/m^2$ to 30 $mg/m^2$;

optionally, a surface density of the silicate multi-metal salt in the positive electrode plate is selected from 0.001 $g/cm^2$ to 0.5 $g/cm^2$; and optionally, the surface density of the silicate multi-metal salt in the positive electrode plate is selected from 0.01 $g/cm^2$ to 0.1 $g/cm^2$.

In some implementations of this application, the preparation of the negative electrode plate including the silicate multi-metal salt includes: coating at least one surface of a negative electrode current collector with a negative electrode slurry, drying, and compacting, where the negative electrode slurry includes a negative electrode active substance, the silicate multi-metal salt, a conductive agent, a binder, and a solvent;

optionally, in the negative electrode slurry, a mass percentage of the silicate multi-metal salt relative to the negative electrode active substance is selected from 0.005% to 5%; optionally, the mass percentage of the silicate multi-metal salt relative to the negative electrode active substance is selected from 0.02% to 3%; optionally, the mass percentage of the silicate multi-metal salt relative to the negative electrode active substance is selected from 0.1% to 3%;

optionally, in the negative electrode slurry, a ratio of a mass of the silicate multi-metal salt relative to a specific surface area of the negative electrode active substance is selected from 0.01 to 100 $mg/m^2$; optionally, the ratio of the mass of the silicate multi-metal salt relative to the specific surface area of the negative electrode active substance is selected from 0.1 to 30 $mg/m^2$;

optionally, a surface density of the silicate multi-metal salt in the positive electrode plate is selected from 0.001 to 0.5 $g/cm^2$; and optionally, the surface density of the silicate multi-metal salt in the positive electrode plate is selected from 0.01 to 0.1 $g/cm^2$.

A plurality of silicate multi-metal salts used in this application have excellent three-dimensional spatial structures, and have excellent physicochemical properties in one or more of the following aspects: spreadability, viscosity increase, film-forming assistance, thickening, rheology, thixotropy, suspension, colloidal thixotropy, a function of an emulsification stabilizer, and the like. Adding the special silicate multi-metal salt to the positive electrode slurry or the negative electrode slurry increases system stability of the positive electrode slurry or the negative electrode slurry, improves film layer evenness of the slurry applied on the positive electrode current collector or the negative electrode current collector, and improves quality stability of the electrode and the secondary battery.

In some implementations of this application, the secondary battery is as defined in the first aspect of this application. The secondary battery obtained through the preparation of the third aspect of this application may be any suitable secondary battery of the first aspect of this application, and has a feature of a long life.

Details of one or more embodiments of this application are set forth in the accompanying drawings and descriptions below. Other features, objectives, and advantages of this application become clear from this specification, the accompanying drawings, and the claims.

BRIEF DESCRIPTION OF DRAWINGS

In order to better describe and illustrate those embodiments or examples of those applications disclosed herein, reference may be made to one or more accompanying drawings. Additional details or examples used to describe the accompanying drawings shall not be regarded as limiting the scope of any one of the disclosed application, the currently described embodiments or examples, and these currently understood optimal modes of these applications. Moreover, throughout the drawings, the same reference numerals indicate the same components. In the drawings.

REFERENCE NUMERALS IN THE DRAWINGS

Figure 1:
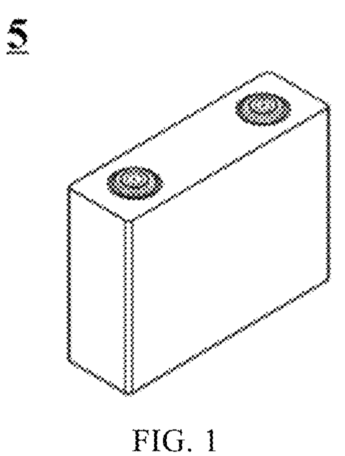
FIG. 1 is a schematic diagram of a secondary battery according to an embodiment of this application.

5. Secondary battery; 51. Shell; 52. Electrode assembly; 53. Cover plate; and 6. Electrical apparatus.

DETAILED DESCRIPTION

The following describes in detail and discloses some implementations of a secondary battery, an electrical apparatus, and an application of a silicate multi-metal salt according to this application with due reference to the accompanying drawings.

However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject matter recited in the claims.

A "range" disclosed in this application is defined in the form of a lower limit and an upper limit. A given range is defined by a lower limit and an upper limit selected. The selected lower and upper limits define boundaries of a particular range.

A range so defined may be inclusive or exclusive of end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4 and 5 are listed, the following ranges are all expectable: 1 to 3, 1 to 4, 1 to 5, 2 to 3, 2 to 4, and 2 to 5. Unless otherwise specified in this application, a numerical range "a to b" is a brief representation of any combination of real numbers between a and b inclusive, where both a and b are real numbers. For example, a numerical range "0 to 5" herein means all real numbers listed between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on. For example, when a parameter is expressed as an integer selected from "2 to 10", it is equivalent to listing integers 2, 3, 4, 5, 6, 7, 8, 9, and 10.

Unless otherwise expressly specified, any implementations and optional implementations in this application may be combined with each other to form a new technical solution.

Unless otherwise expressly specified, any technical features and optional technical features in this application may be combined with each other to form a new technical solution.

Unless otherwise expressly specified, all steps in this application may be performed in sequence or at random, and preferably in sequence. For example, that the method includes steps (a) and (b) indicates that the method may include steps (a) and (b) performed in sequence, or steps (b) and (a) performed in sequence. For example, the mention that the method may further include step (c) indicates that step (c) may be added into the method in any sequence. For example, the method may include steps (a), (b), and (c), or may include steps (a), (c), and (b), or may include steps (c), (a), and (b), and so on.

Unless otherwise expressly specified, "include" and "comprise" referred to in this application may be open-ended, or close-ended. For example, the "include" and "comprise" may indicate that other components not listed may also be included or comprised, or that only the listed components may be included or comprised.

Unless otherwise expressly specified, in this application, the term "or" is inclusive. For instance, the phrase "A or B" means "A, B, or both A and B". Further, any of the following conditions satisfy condition "A or B": A is true (or exists) and B is false (or does not exist); A is false (or does not exist) and B is true (or exists); or both A and B are true (or exist).

This application relates to "more than one", "a plurality of", and the like, which, if not specifically limited, means a number greater than or equal to 2. For example, "one or more" means one or more than or equal to two.

"A combination thereof", "any combination thereof", "any combination manner thereof", and the like used in this specification include all suitable combination manners of any two or more of the listed items.

In this specification, "suitable" in "suitable combination manners", "suitable manners", "any suitable manner" and the like shall be subject to implementation of the technical solutions in this application.

In this specification, "preferred", "better", "greater", and "appropriate" only describe an implementation or embodiment with a better effect, and it should be understood that "preferred", "better", "greater", and "appropriate" do not constitute a limitation on the protection scope of this application. If more than one "preferred" appears in a technical solution, if not otherwise specified, each "preferred" is independent of the other if there is no contradiction or mutual constraint.

In this application, "further", "furthermore", "especially" and the like are used for descriptive purposes to indicate differences in content, but should not be understood as a limitation of the protection scope of this application.

In this application, the terms "first", "second", and "third" in the "first aspect", "second aspect", and "third aspect" are used for descriptive purposes only, and are not to be understood as an indication or implication of relative significance or a quantity, or an implicit indication of significance or a quantity of the indicated technical features. Moreover, the terms "first", "second", "third", "fourth", and the like are only used for the purpose of non-exhaustive enumeration and description, and should be understood as not constituting a closed-ended limitation of the quantity.

In this application, the term "room temperature" generally refers to 4° C. to 35° C., and may refer to 20° C.±5° C. In some embodiments of this application, room temperature refers to 20° C. to 30° C.

In this application, for units involving a data range, if only a right endpoint is followed by a unit, it indicates that units of a left endpoint and the right endpoint are the same. For example, 3 to 5 h or 3-5 h both indicate that units of the left endpoint "3" and the right endpoint "5" are both h (hour).

Weights of relevant components mentioned in this specification of embodiments of this application may not only refer to a content of the components, but may also indicate a proportion relationship of the weights of the components. Therefore, as long as the weights are scaled up or down proportionally based on the content of the relevant components in this specification of embodiments of this application, the weights all fall within the scope disclosed in this specification of embodiments of this application. Further, the weight described in this specification of embodiments of this application may be a mass unit such as g, mg, g, or kg that is well known in the field of the chemical industry.

Currently, it is urgent to further prolong the cycle service life of a secondary battery product. The applicants of this application have found, through experimental research, that due to a volume effect of an active material in a cycling process and an increase in interfacial activity in a high SOC state, an interfacial structure is easily damaged. Therefore, improving interfacial stability can be used as a strategy to improve the cycle service life of the secondary battery. In order to adapt to the volume effect in the cycling process and inhibit excessive consumption of an electrolytic solution, the perspective of stabilizing interface components may be considered.

Currently, modification of an electrode-electrolytic solution interface is mainly performed by coating a material interface with a layer of interface components in a non-in-situ manner or an in-situ manner. However, most of the manners cannot effectively improve interfacial stability, especially cannot effectively improve interfacial stability in the high SOC state. The applicants of this application speculate that the reason may be that an interface structure generated through non-in-situ coating cannot implement even coating and stable existence in charging and discharging processes. For a manner of using electrolytic solution additives to generate the interface components in the in-situ manner, inorganic components in an inner layer of the interface are mostly oxides or salts of a crystal structure, and the inorganic inner layer is easy to rupture in a volume change process of lithium deintercalation/intercalation, which easily causes a direct contact between active components and the electrolytic solution, resulting in excessive consumption of the electrolytic solution and active lithium, and deterioration of performance of a battery cell.

To resolve the common technical problems described above, according to a first aspect, this application provides a secondary battery, where at least one of a positive electrode active material layer of a positive electrode plate and a negative electrode active material layer of a negative electrode plate includes a silicate multi-metal salt. A chemical formula of the silicate multi-metal salt is at least one selected from $YSi_2Z^1Z^2O_8$ and $X^1X^2Si_2Z^1Z^2O_8$, Y is selected from second main group elements, $X^1$ and $X^2$ are each independently selected from first main group elements, and $Z^1$ and $Z^2$ are each selected from third main group elements.

Typically, the secondary battery includes a positive electrode plate, a negative electrode plate, an electrolyte and a separator. In the charging and discharging processes of the battery, active ions are intercalated and deintercalated between the positive electrode plate and the negative electrode plate back and forth. The electrolyte serves to conduct ions between the positive electrode plate and the negative electrode plate. The separator is provided between the positive electrode plate and the negative electrode plate, which mainly serves to prevent positive and negative electrodes from short-circuiting, and allows active ions to pass through.

In this application, if not otherwise specified, the electrolyte is in a liquid state, and is an electrolytic solution in this case.

In some implementations of this application, a secondary battery is provided, and includes a positive electrode plate, a negative electrode plate, a separator, and an electrolytic solution, where the separator is located between the positive electrode plate and the negative electrode plate, the positive electrode plate includes a positive electrode active material layer, and the negative electrode plate includes a negative electrode active material layer;

at least one of the positive electrode active material layer and the negative electrode active material layer includes a silicate multi-metal salt; and a chemical formula of the silicate multi-metal salt is at least one selected from $YSi_2Z^1Z^2O_8$ and $X^1X^2Si_2Z^1Z^2O_8$;

where

Y is selected from second main group elements;

$X^1$ and $X^2$ are each independently selected from first main group elements; and $Z^1$ and $Z^2$ are each selected from third main group elements.

In this application, if not specifically limited, a silicate salt (silicate salt) may be a silicate mono-metal salt (silicate mono-metal salt) including a single type of metal element, or a silicate multi-metal salt (silicate multi-metal salt) including two or more types of metal elements.

In this application, if not specifically limited, the "silicate multi-metal salt of this application (silicate multi-metal salt of this application)" refers to a special silicate complex salt having the chemical formula shown in $YSi_2Z^1Z^2O_8$ or $X^1X^2Si_2Z^1Z^2O_8$, where Y is selected from second main group elements, $X^1$ and $X^2$ are each independently selected from first main group elements, and $Z^1$ and $Z^2$ are each selected from third main group elements. In this application, "the chemical formula of the silicate multi-metal salt is at least one selected from $YSi_2Z^1Z^2O_8$ and $X^1X^2Si_2Z^1Z^2O_8$" means that the silicate multi-metal salt is at least one selected from a substance shown in the chemical formula $YSi_2Z^1Z^2O_8$ and a substance shown in the chemical formula $X^1X^2Si_2Z^1Z^2O_8$. Any substance conforming to the chemical formula in the context of this application is included in a category of the "silicate multi-metal salt of this application".

In this application, if not otherwise specified, an electrode plate can be the positive electrode plate or the negative electrode plate, and an "active substance" in the electrode plate refers to a substance with a capability of reversibly intercalating and deintercalating active ions. If not otherwise specified, a "negative electrode active substance" refers to a substance, used in the negative electrode plate, with a capability of reversibly intercalating and deintercalating the active ions, and a "positive electrode active substance" refers to a substance, used in the positive electrode plate, with a capability of reversibly deintercalating and intercalating the active ions. When the secondary battery is charged, the active ions are deintercalated from the positive electrode and intercalated in the negative electrode through the electrolyte; and when the secondary battery is discharged, the active ions are deintercalated from the negative electrode and intercalated in the positive electrode. The active ions are not particularly limited, and may be lithium ions (which may correspond to a lithium-ion secondary battery), may be sodium ions (which may correspond to a sodium-ion secondary battery), may be potassium ions, or the like. In this application, an "active material" and the "active substance" have the same meaning and can be used interchangeably; the "positive electrode active substance" and a "positive electrode active material" have the same meaning and can be used interchangeably; and the "negative electrode active substance" and a "negative electrode active material" have the same meaning and can be used interchangeably.

In this application, if not specifically specified, an "active material layer" includes the positive electrode active material layer of the positive electrode plate and the negative electrode active material layer of the negative electrode plate, and may refer to the positive electrode active material layer or the negative electrode active material layer in detailed circumstances.

In this application, if not specifically specified, the "electrode-electrolytic solution interface" includes a cathode electrolyte interface (denoted as CEI) between the positive electrode plate and the electrolyte and a solid electrolyte interface (denoted as SEI) between the negative electrode plate and the electrolyte, and may refer to the CEI interface or the SEI interface in detailed circumstances.

In this application, if not specifically limited, an "electrolyte interface film" refers to a passivation layer generated through an oxidation or reduction reaction of the electrolytic solution at an interface of electrode materials, where the oxidation or reduction reaction is performed due to charging and discharging processes at a solid-liquid phase interface between the electrode materials and the electrolytic solution. The passivation layer is an interface layer with characteristics of a solid electrolyte, and is an electronic insulator but an excellent conductor of the active ions (such as the lithium ions or the sodium ions), where the active ions can be freely intercalated and deintercalated through the passivation layer. An electrolyte interface film formed between the positive electrode plate and the electrolytic solution is called a cathode electrolyte interface film, which may be denoted as a CEI film. An electrolyte interface film formed between the negative electrode plate and the electrolytic solution is called a solid electrolyte interface film, which may be denoted as an SEI film. If not specifically indicated, the electrolyte interface film involved in this application includes the CEI film and the SEI film, and may also refer to the CEI film or the SEI film.

The special silicate multi-metal salt is used as an interfacial stabilizer in an electrode plate of the secondary battery, which can improve infiltration performance of an electrolytic solution, stabilize an electrode-electrolytic solution interface, improve cycle performance, and prolong the service life of the battery. The silicate multi-metal salt in this application includes specific short-period main group I to III elements, and these short-period main group elements can participate in formation of an electrolyte interfacial film. The silicate multi-metal salt in this application can be used as an interfacial stabilizer to improve the infiltration performance of the electrolytic solution, stabilize the electrode-electrolytic solution interface, improve the cycle performance and storage performance of the secondary battery, and prolong the service life of the secondary battery. The silicate multi-metal salt can stabilize both a cathode electrolyte interface (CEI) and a solid electrolyte interface (SEI). By contrast, main group IV to VII elements have weak force with an element oxygen or include many lone pair electrons and are prone to an oxidation reaction. In addition, long period sub-group elements have many virtual orbitals that catalyze a redox reaction of the electrolytic solution.

The applicants of this application have also found that it is difficult to dissolve the foregoing silicate multi-metal salt in a non-aqueous electrolytic solution (such as commercial carbonate), and that increasing an amount of the silicate multi-metal salt to prepare for a gel state of the electrolytic solution inhibits conduction of the active ions (lithium ions or sodium ions) and affects a capacity of the battery. Therefore, it is difficult to improve the electrode-electrolytic solution interface stability by adding the special silicate multi-metal salt to the electrolytic solution. The applicants of this application have found that even if a large quantity of such silicate multi-metal salts are added to the electrolytic solution, because there is only a small amount of the solution, after a full battery is assembled, there is almost no improvement in performance of the secondary battery in terms of an internal resistance of the battery cell, a cycle capacity retention rate, and the like. The applicants of this application have accidentally found that, when the foregoing silicate multi-metal salt is introduced into the active material in the positive electrode plate or the negative electrode plate, the foregoing silicate multi-metal salt may be evenly dispersed on particle surfaces, to stabilize the electrode-electrolytic solution interface.

In some implementations of this application, a structural formula of the silicate multi-metal salt is at least one selected from Formula I and Formula II:

I

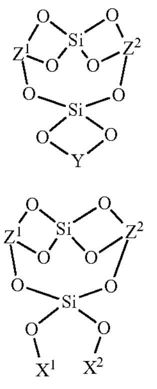

II

A plurality of silicate multi-metal salts used in this application have excellent three-dimensional spatial structures, and have excellent physicochemical properties in one or more of the following aspects: spreadability, viscosity increase, film-forming assistance, thickening, rheology, thixotropy, suspension, colloidal thixotropy, a function of an emulsification stabilizer, and the like. Adding the special silicate multi-metal salt to the active material layer of the electrode plate is conducive to improving the infiltration performance of the electrolytic solution and stabilizing the electrode-electrolytic solution interface. In addition, the silicate multi-metal salt of this application also has certain alkalinity, and can remove acidic substances in the electrolytic solution and inhibit destruction of an interfacial structure by hydrofluoric acid (HF) and the like.

In some implementations of this application, the secondary battery satisfies any one or more of the following characteristics:

Y is Mg or Be;

$X^1$ and $X^2$ are each independently Li or Na;

$X^1$ and $X^2$ are the same in an identical molecule;

$Z^1$ and $Z^2$ are each independently Al or B; and $Z^1$ and $Z^2$ are the same in an identical molecule.

In some implementations, Y is Mg or Be.

$X^1$ and $X^2$ may be the same or different. In some implementations, $X^1$ and $X^2$ are each independently Li or Na; and further, in some of these embodiments, $X^1$ and $X^2$ are the same in an identical molecule.

$Z^1$ and $Z^2$ may be the same or different. In some implementations, $Z^1$ and $Z^2$ are each independently Al or B; and further, in some of these embodiments, $Z^1$ and $Z^2$ are the same in an identical molecule.

In some implementations of this application, the silicate multi-metal salt may include one or more of magnesium aluminum silicate, magnesium boron silicate, beryllium aluminum silicate, beryllium boron silicate, lithium aluminum silicate, lithium boron silicate, sodium aluminum silicate, and sodium boron silicate.

In some embodiments, the silicate multi-metal salt includes the magnesium aluminum silicate. In a non-limitative example of the silicate multi-metal salt, the magnesium aluminum silicate has a unique three-dimensional spatial chain structure and a special needle-stick crystal structure. Therefore, the magnesium aluminum silicate has special colloidal and adsorption performance, and also has excellent performance in aspects such as thickening, suspension, and colloidal thixotropy, so that a "card house" type of association network structure can be formed in an aqueous medium. The magnesium aluminum silicate has specific spreadability, and can play a role in viscosity increase and film-forming assistance, thereby improving infiltration performance of the electrolytic solution in an electrode interface. The magnesium aluminum silicate also has certain viscosity, can cover a positive electrode active material interface or a negative electrode active material interface like a glue, and can also improve stability of decomposition products of an electrolytic solution additive (such as carbonate or other additives) in the electrolytic solution interface. Therefore, the magnesium aluminum silicate can improve the infiltration performance of the electrolytic solution, and stabilize the electrode-electrolytic solution interface. The magnesium aluminum silicate also has certain alkalinity, and can remove acidic substances in the electrolytic solution and inhibit destruction of an interfacial structure by HF and the like.

In some implementations of this application, the positive electrode active material layer includes the silicate multi-metal salt, and the negative electrode active material layer does not include the silicate multi-metal salt.

In some implementations of this application, the negative electrode active material layer includes the silicate multi-metal salt, and the positive electrode active material layer does not include the silicate multi-metal salt.

In some implementations of this application, both the positive electrode active material layer and the negative electrode active material layer include the silicate multi-metal salt.

The silicate multi-metal salt of this application may be added to the positive electrode active material layer to stabilize the CEI film, and may also be added to the negative electrode active material layer to stabilize the SEI film, which is conducive to reducing deterioration of impedance in a cycling process, improving the interfacial stability, and improving the cycle capacity retention rate, and has a certain improvement function for cycle stability and capacity usage of the battery cell.

In some embodiments, the silicate multi-metal salt of this application is introduced into both the positive electrode plate and the negative electrode plate, which has an excellent improvement effect on the cycle stability and the capacity usage of the battery cell.

In this application, the electrode plate includes a current collector and a film layer disposed on at least one surface of the current collector, where the film layer includes a corresponding active material layer, and the active material layer includes a corresponding active substance.

In this application, the positive electrode plate includes a positive electrode current collector and a positive electrode film layer disposed on at least one surface of the positive electrode current collector, where the positive electrode film layer includes the positive electrode active material layer, and further, the positive electrode active material layer includes the positive electrode active substance. The positive electrode film layer includes a positive electrode material.

In this application, the negative electrode plate includes a negative electrode current collector and a negative electrode film layer disposed on at least one surface of the negative electrode current collector, where the negative electrode film layer includes the negative electrode active material layer, and further, the negative electrode active material layer includes the negative electrode active substance. The negative electrode film layer includes a negative electrode material.

The positive electrode material and the negative electrode material may each independently further include an additive (which may include one or more of a conductive agent and a binder). Types and contents of the conductive agent and the binder are not specifically limited, and may be selected based on actual requirements.

In addition, types and models of the separator and the current collector are not particularly limited, and may be selected based on actual requirements.

In this application, a content of the silicate multi-metal salt in the electrode plate may be determined according to an elemental analysis method known in the art, such as inductively coupled plasma emission spectrometry. Elemental analysis testing of solid particles remaining after removal of agents from the electrode plate may be performed according to a conventional method.

Positive Electrode Plate

In this application, the positive electrode plate includes a positive electrode current collector and a positive electrode film layer disposed on at least one surface of the positive electrode current collector, where the positive electrode film layer includes the positive electrode active material layer, and further, the positive electrode active material layer includes the positive electrode active substance.

In some implementations of this application, the positive electrode active material layer includes a positive electrode active substance and the silicate multi-metal salt. In this case, the silicate multi-metal salt in this application is introduced into the positive electrode plate. Adding the silicate multi-metal salt of this application to the positive electrode active material layer of the positive electrode plate is conducive to reducing deterioration of impedance in a cycling process, improving stability of the cathode electrolyte interface (CEI), and improving a cycle capacity retention rate, so that cycle stability and capacity usage of a battery cell can be improved to some extent.

In some implementations of this application, one or more of parameters such as a mass percentage of the silicate multi-metal salt relative to the positive electrode active substance, a ratio of a mass of the silicate multi-metal salt relative to a specific surface area of the positive electrode active substance, and a surface density of the silicate multi-metal salt in the positive electrode plate may be used to represent a content of the silicate multi-metal salt in the positive electrode active material layer or the positive electrode plate.

In some implementations, in the positive electrode active material layer, the mass percentage of the silicate multi-metal salt relative to the positive electrode active substance is selected from 0.001% to 2%; optionally, the mass percentage of the silicate multi-metal salt relative to the positive electrode active substance is selected from 0.01% to 2%; and optionally, the mass percentage of the silicate multi-metal salt relative to the positive electrode active substance is selected from 0.1% to 2%. In the positive electrode active material layer, the mass percentage of the silicate multi-metal salt relative to the positive electrode active substance may also be selected from any one of the following percentages or a numerical interval formed by any two of the following percentages: 0.001%, 0.005%, 0.01%, 0.05%, 0.1%, 0.2%, 0.3%, 0.4%, 0.5%, 0.6%, 0.7%, 0.8%, 0.9%, 1.0%, 1.2%, 1.4%, 1.5%, 1.6%, 1.8%, 2%, and the like.

In some implementations, in the positive electrode active material layer, the ratio of the mass of the silicate multi-metal salt relative to the specific surface area of the positive electrode active substance is selected from 0.01 $mg/m^2$ to 100 $mg/m^2$; and optionally, the ratio of the mass of the silicate multi-metal salt relative to the specific surface area of the positive electrode active substance is selected from 0.1 $mg/m^2$ to 30 $mg/m^2$. In the positive electrode active material layer, the ratio of the mass of the silicate multi-metal salt relative to the specific surface area of the positive electrode active substance may also be selected from any one of the following values or a numerical interval formed by any two of the following values: 0.01 $mg/m^2$, 0.05 $mg/m^2$, 0.1 $mg/m^2$, 0.5 $mg/m^2$, 1 $mg/m^2$, 2 $mg/m^2$, 3 $mg/m^2$, 4 $mg/m^2$, 5 $mg/m^2$, 6 $mg/m^2$, 8 $mg/m^2$, 10 $mg/m^2$, 12 $mg/m^2$, 15 $mg/m^2$, 16 $mg/m^2$, 18 $mg/m^2$, 20 $mg/m^2$, 25 $mg/m^2$, 30 $mg/m^2$, 35 $mg/m^2$, 40 $mg/m^2$, 45 $mg/m^2$, 50 $mg/m^2$, 60 $mg/m^2$, 70 $mg/m^2$, 80 $mg/m^2$, 90 $mg/m^2$, 100 $mg/m^2$, and the like.

In some implementations, the surface density of the silicate multi-metal salt in the positive electrode plate is selected from 0.001 $g/cm^2$ to 0.5 $g/cm^2$; and optionally, the surface density of the silicate multi-metal salt in the positive electrode plate is selected from 0.01 $g/cm^2$ to 0.1 $g/cm^2$. The surface density of the silicate multi-metal salt in the positive electrode plate may also be selected from any one of the following values or a numerical interval formed by any two of the following values: 0.001 $g/cm^2$, 0.005 $g/cm^2$, 0.01 $g/cm^2$, 0.02 $g/cm^2$, 0.03 $g/cm^2$, 0.04 $g/cm^2$, 0.05 $g/cm^2$, 0.06 $g/cm^2$, 0.07 $g/cm^2$, 0.08 $g/cm^2$, 0.09 $g/cm^2$, 0.1 $g/cm^2$, 0.15 $g/cm^2$, 0.2 $g/cm^2$, 0.25 $g/cm^2$, 0.3 $g/cm^2$, 0.35 $g/cm^2$, 0.4 $g/cm^2$, 0.45 $g/cm^2$, 0.5 $g/cm^2$, and the like.

In some implementations, the positive electrode plate includes a CEI film, the CEI film is located on a surface on a side of the positive electrode active material layer away from a positive electrode current collector, and the CEI film includes the silicate multi-metal salt.

In the positive electrode active material layer, when an addition amount of the silicate multi-metal salt is relatively small, dispersion evenness of the silicate multi-metal salt on a surface of the positive electrode material is reduced, which affects full protection effect for the CEI; and when an addition amount of the silicate multi-metal salt is relatively high, too much silicate multi-metal salt may be enriched at the interface of the positive electrode material, because the silicate multi-metal salt has a poor conductive ability, a large interface internal resistance may be generated and performance of the battery cell is deteriorated.

In some implementations of this application, the secondary battery is a lithium-ion secondary battery or a sodium-ion secondary battery.

The lithium-ion secondary battery and the sodium-ion secondary battery are similar in basic principles and electrochemical reaction properties, and both utilize intercalation and deintercalation of the active ions at electrodes and transmission in the electrolyte to implement the charging and discharging processes. In general, the active ions in the lithium-ion secondary battery are the lithium ions, and the active ions in the sodium-ion secondary battery are the sodium ions, but these are not limited thereto. The silicate multi-metal salt in this application can be used to optimize performance of both the lithium-ion secondary battery and the sodium-ion secondary battery. In both secondary battery systems, the silicate multi-metal salt can improve the infiltration performance of the electrolytic solution, stabilize the electrode-electrolytic solution interface, improve cycle performance and storage performance of the secondary batteries, and prolong the service lives of the secondary batteries. In addition, the silicate multi-metal salt in this application can stabilize the electrode-electrolytic solution interface and improve the performance of the battery cell in a plurality of secondary batteries including different types of positive electrode active substances.

The positive electrode active substance may be selected from materials that can have a volume change in a process of deintercalation and intercalation of the active ions (such as lithium ions, sodium ions, or potassium ions) and whose active material interface has a catalytic effect on the electrolytic solution.

In some implementations of this application, the positive electrode active substance includes a lithium-ion material. Further, the secondary battery is the lithium-ion secondary battery.

In some implementations, the lithium-ion material includes at least one of a lithium-containing phosphate and a lithium transition metal oxide.

In some implementations, the positive electrode active substance may be a positive electrode active substance that is well known for use in the battery in the art. In a non-limitative example, the positive electrode active substance may include one or more of the following materials or substances: olivine-structured lithium-containing phosphate, lithium transition metal oxide, and a modified compound thereof. However, this application is not limited to these materials or substances, and other conventional materials or substances that may be used as the positive electrode active substance for the battery may also be used. For these positive electrode active substances, only one may be used alone, or more than two may be used in combination.

A non-limitative example of the lithium transition metal oxide may include, but is not limited to, one or more of a lithium cobalt oxide (such as $LiCoO_2$), a lithium nickel oxide (such as $LiNiO_2$), a lithium manganese oxide (such as $LiMnO_2$ or $LiMn_2O_4$), a lithium nickel cobalt oxide, a lithium manganese cobalt oxide, a lithium nickel manganese oxide, a lithium nickel cobalt manganese oxide (such as $LiNi_{1/3}Co_{1/3}Mn_{1/3}O_2$ (which may also be $NCM_{333}$ for short), $LiNi_{0.5}Co_{0.2}Mn_{0.3}O_2$ (which may also be $NCM_{523}$ for short), $LiNi_{0.5}Co_{0.25}Mn_{0.25}O_2$ (which may also be $NCM_{211}$ for short), $LiNi_{0.6}Co_{0.2}Mn_{0.2}O_2$ (which may also be $NCM_{622}$ for short), $LiNi_{0.8}Co_{0.1}Mn_{0.1}O_2$ (which may also be $NCM_{511}$ for short), a lithium nickel cobalt aluminum oxide (such as $LiNi_{0.85}Co_{0.15}Al_{0.05}O_2$) and modified compounds thereof, and the like. A non-limitative example of the lithium-containing phosphate of an olivine structure may include, but is not limited to, one or more of lithium iron phosphate (such as $LiFePO_4$ (which may also be LFP for short)), a composite material of lithium iron phosphate and carbon, lithium manganese phosphate (such as $LiMnPO_4$), a composite material of lithium manganese phosphate and carbon, lithium manganese iron phosphate, and a composite material of lithium manganese iron phosphate and carbon.

In some implementations, the positive electrode active substance may include, but is not limited to, lithium iron phosphate, lithium manganese iron phosphate, a lithium cobalt oxide, a lithium nickel oxide, a lithium manganese oxide, a lithium nickel manganese oxide, a lithium nickel manganese oxide, a lithium nickel cobalt manganese oxide, a lithium nickel cobalt aluminum oxide, a sodium oxide, a potassium oxide, and a material including any one of the foregoing substances and a doping element. Further, the doping element in any positive electrode active substance independently includes one or more of a transition metal element and a non-transition metal element.

In some implementations of this application, the positive electrode active substance includes a sodium-ion material. Further, the secondary battery is the sodium-ion secondary battery.

In some implementations, the sodium-ion material includes one or more of a sodium transition metal oxide, a polyanionic compound, and a Prussian blue compound. Suitable positive electrode active materials may be flexibly selected, to provide the sodium-ion battery with more selectivity and wider applicability.

In some implementations, the positive electrode active substance may include, but is not limited to, one or more of a sodium transition metal oxide, a polyanionic compound, and a Prussian blue compound. However, this application is not limited to the foregoing enumerated materials or substances, and other known materials or substances that may be used as the positive electrode active substances for the sodium-ion battery may also be used.

In some implementations, transition metal in the sodium transition metal oxide may be one or more of Mn, Fe, Ni, Co, Cr, Cu, Ti, Zn, V, Zr, and Ce. A non-limitative example of the sodium transition metal oxide may be $Na_xZO_2$, where Z may be one or more of Ti, V, Mn, Co, Ni, Fe, Cr, and Cu, and $0<x\leq1$.

In some implementations, the sodium transition metal oxide may be $Na_{1-x}Cu_hFe_kMn_lM^1_mO_{2-y}$, where $M^1$ may be one or more of Li, Be, B, Mg, Al, K, Ca, Ti, Co, Ni, Zn, Ga, Sr, Y, Nb, Mo, In, Sn, and Ba, $0<x\leq0.33$, $0<h\leq0.24$, $0\leq k\leq0.32$, $0<l\leq0.68$, $0\leq m<0.1$, $h+k+l+m=1$, and $0\leq y<0.2$.

In some implementations, the sodium transition metal oxide may be $Na_{0.67}Mn_{0.7}Ni_qM^2_{0.3-z}O_2$, where $M^2$ may be one or more of Li, Mg, Al, Ca, Ti, Fe, Cu, Zn, and Ba, and $0<q\leq0.1$.

In some implementations, the sodium transition metal oxide may be $Na_aLi_bNi_cMn_dFe_eO_2$, where 0.67<a≤1, 0<b<0.2, 0<c<0.3, 0.67<d+e<0.8, and b+c+d+e=1.

In some implementations, the polyanionic compound may be a type of compounds having a sodium ion, a transition metal ion, and a tetrahedral $(YO_4)^{n-}$ anion unit. The transition metal herein may be one or more of Mn, Fe, Ni, Co, Cr, Cu, Ti, Zn, V, Zr, and Ce; Y may be one or more of P, S, and Si; and n represents a valence of $(YO_4)^{n-}$.

In some implementations, the polyanionic compound may also be a type of compounds having a sodium ion, a transition metal ion, a tetrahedral $(YO_4)^{n-}$ anion unit, and a halogen anion. The transition metal herein may be one or more of Mn, Fe, Ni, Co, Cr, Cu, Ti, Zn, V, Zr, and Ce; Y may be one or more of P, S, and Si; n represents a valence of $(YO_4)^{n-}$; and a halogen may be one or more of F, Cl, and Br.

In some implementations, the polyanionic compound may also be a type of compounds having a sodium ion, a tetrahedral $(YO_4)^{n-}$ anion unit, a polyhedral unit $(ZO_y)^{m+}$, and an optional halogen anion. Y may be one or more of P, S, and Si, and n represents a valence of $(YO_4)^{n-}$; Z represents transition metal and may be one or more of Mn, Fe, Ni, Co, Cr, Cu, Ti, Zn, V, Zr, and Ce, and m represents a valence of $(ZO_y)^{m+}$; and a halogen may be one or more of F, Cl, and Br.

In some implementations, the polyanionic compound may be one or more of $NaFePO_4$, $Na_3V_2(PO_4)_3$, $NaM'PO_4F$, and $Na_3(VO_y)_2(PO_4)_2F^{3-}2_y$ (0≤y≤1), where M' in $NaM'PO_4F$ may be one or more of V, Fe, Mn, and Ni.

In some implementations, the Prussian blue compound may be a type of compounds having a sodium ion, a transition metal ion, and a cyanide ion ($CN^-$). The transition metal herein may be one or more of Mn, Fe, Ni, Co, Cr, Cu, Ti, Zn, V, Zr, and Ce. A non-limitative example of the Prussian blue compound may be $Na_aMe_bMe'_c(CN)_6$, where Me and Me' may each independently be one or more of Ni, Cu, Fe, Mn, Co, and Zn, 0<a≤2, 0<b<1, and 0<c<1.

In a non-limitative example, the positive electrode current collector has two opposite surfaces in a thickness direction of the positive electrode current collector, and the positive electrode film layer is disposed on either or both of the two opposite surfaces of the positive electrode current collector.

In some implementations, the positive electrode current collector may use, but is not limited to, a conductive carbon plate, a metal foil, a carbon coated metal foil, a porous metal plate, or a composite current collector. A conductive carbon material of the conductive carbon plate may be one or more of superconducting carbon, acetylene black, carbon black, Ketjen black, a carbon dot, a carbon nanotube, graphite, graphene, and a carbon nanofiber. Metal materials of the metal foil, the carbon coated metal foil, and the porous metal plate may each independently be one or more selected from copper, aluminum, nickel, and stainless steel. The composite current collector may be a composite current collector formed by compositing the metal foil with a polymer base film.

In some implementations, the positive electrode current collector may be a metal foil or a composite current collector. For example, the metal foil may be an aluminum foil. The composite current collector may include a polymer material substrate and a metal layer formed on at least one surface of the polymer material substrate. The composite current collector may be formed by forming a metal material (aluminum, aluminum alloy, nickel, nickel alloy, titanium, titanium alloy, silver, silver alloy, and the like) on the polymer material substrate (such as polypropylene (PP), polyethylene terephthalate (PET), polybutylene terephthalate (PBT), polystyrene (PS), or polyethylene (PE)).

In some implementations, the positive electrode film layer further optionally includes a binder. In a non-limitative example, the positive electrode active substance and the optional conductive agent are firmly bonded to the positive electrode current collector. A type of the binder is not specifically limited in this application, and may be selected based on actual requirements. In a non-limitative example, in some secondary batteries (such as the lithium-ion battery), the binder may include one or more of polyvinylidene fluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), and fluorinated acrylate resin. In a non-limitative example, in some secondary batteries (such as the sodium-ion battery), the binder may include one or more of polyvinylidene fluoride (PVDF), polytetrafluoroethylene (PTFE), poly(vinylidene fluoride-co-tetrafluoroethylene-co-propylene), poly(vinylidene fluoride-co-hexafluoropropylene-co-tetrafluoroethylene), poly(tetrafluoroethylene-co-hexafluoropropylene), fluorinated acrylate resin, polyacrylic acid (PAA), polyvinyl alcohol (PVA), ethylene-vinylacetate copolymer (EVA), styrene-butadiene rubber (SBR), carboxymethyl cellulose (CMC) and a salt thereof (such as sodium salt), sodium alginate (SA), polymethacrylic acid (PMA), and carboxymethyl chitosan (CMCS).

In some implementations, the positive electrode film layer further optionally includes a conductive agent. In a non-limitative example, the conductive agent may include one or more of superconducting carbon, acetylene black, carbon black, Ketjen black, a carbon dot, a carbon nanotube, graphene, and a carbon nanofiber.

In some implementations, the positive electrode plate may be prepared according to the following method: The components described above for preparing the positive electrode plate, for example, the positive electrode active substance, the silicate multi-metal salt (which may or may not be added), the conductive agent, the binder, and any other components, are dispersed in a solvent (such as N-methylpyrrolidone) to form a positive electrode slurry. At least one surface (which may be a single surface or two surfaces) of the positive electrode current collector is coated with the positive electrode slurry. After processes such as drying and compaction (where a manner of cold calendering may be used), the positive electrode plate can be obtained.

Negative Electrode Plate

In this application, the negative electrode plate includes a negative electrode current collector and a negative electrode film layer disposed on at least one surface of the negative electrode current collector, where the negative electrode film layer includes the negative electrode active material layer, and further, the negative electrode active material layer includes the negative electrode active substance.

Currently, an SEI film formed by commonly used types of negative electrode active substances often has some stability problems. For example, graphite is one of the most widely commercially used negative electrode active substances, but intercalation and deintercalation of the active ions (such as the lithium ions) in the charging and discharging processes cause volume expansion and contraction to some extent (such as 10%), which causes certain damages to a graphite layered structure. Meanwhile, it is easy for a graphite flake to strip off due to influence of electrolytic solution solvent co-intercalating, organic solvent reduction, and gas production at a high current in the cycling process. In addition, under conditions of a high temperature and a high SOC, interface instability of a graphite negative electrode increases, which easily causes loss of active substances and destruction of the SEI film, resulting in reduction of the cycle life. In addition, volume expansion of a silicon-based negative electrode material is particularly large (which, for example, may exceed 300%), which easily causes rupture and regeneration of the interface film, resulting in large irreversible capacity loss. In addition, a lithium-silicon alloy has a reactivity, and a new Li—Si interface generated due to material expansion and contraction easily causes excessive consumption of the electrolytic solution and active lithium, resulting in deterioration of the performance of the battery cell. To resolve the above problems, a conventional solution is to use a film-forming additive to generate a stable interface component or to inhibit volume expansion and contraction from the perspective of the negative electrode material.

In some implementations of this application, the negative electrode active material layer includes the negative electrode active substance and the silicate multi-metal salt. In this case, the silicate multi-metal salt in this application is introduced into the negative electrode plate. Adding the silicate multi-metal salt of this application to the negative electrode active material layer is also conducive to reducing deterioration of impedance in a cycling process, improving stability of the solid electrolyte interface (SEI), and improving a cycle capacity retention rate, so that cycle stability and capacity usage of the battery cell can be improved to some extent.

In some implementations of this application, one or more of parameters such as a mass percentage of the silicate multi-metal salt relative to the negative electrode active substance, a ratio of a mass of the silicate multi-metal salt relative to a specific surface area of the negative electrode active substance, and a surface density of the silicate multi-metal salt in the negative electrode plate may be used to represent a content of the silicate multi-metal salt in the negative electrode active material layer or the negative electrode plate.

In some implementations, in the negative electrode active material layer, the mass percentage of the silicate multi-metal salt relative to the negative electrode active substance is selected from 0.005% to 5%; optionally, the mass percentage of the silicate multi-metal salt relative to the negative electrode active substance is selected from 0.02% to 3%; and optionally, the mass percentage of the silicate multi-metal salt relative to the negative electrode active substance is selected from 0.1% to 3%. In the negative electrode active material layer, the mass percentage of the silicate multi-metal salt relative to the negative electrode active substance may also be selected from any one of the following percentages or a numerical interval formed by any two of the following percentages: 0.005%, 0.01%, 0.02%, 0.04%, 0.05%, 0.06%, 0.08%, 0.1%, 0.2%, 0.3%, 0.4%, 0.5%, 0.6%, 0.7%, 0.8%, 0.9%, 1.0%, 1.2%, 1.4%, 1.5%, 1.6%, 1.8%, 2%, 2.5%, 3%, 3.5%, 4%, 4.5%, 5%, and the like.

In some implementations, in the negative electrode active material layer, the ratio of the mass of the silicate multi-metal salt relative to the specific surface area of the negative electrode active substance is selected from 0.01 $mg/m^2$ to 100 $mg/m^2$; and optionally, the ratio of the mass of the silicate multi-metal salt relative to the specific surface area of the negative electrode active substance is selected from 0.1 $mg/m^2$ to 30 $mg/m^2$. In the negative electrode active material layer, the ratio of the mass of the silicate multi-metal salt relative to the specific surface area of the negative electrode active substance may also be selected from any one of the following values or a numerical interval formed by any two of the following values: 0.01 $mg/m^2$, 0.05 $mg/m^2$, 0.1 $mg/m^2$, 0.5 $mg/m^2$, 1 $mg/m^2$, 2 $mg/m^2$, 3 $mg/m^2$, 4 $mg/m^2$, 5 $mg/m^2$, 6 $mg/m^2$, 8 $mg/m^2$, 10 $mg/m^2$, 12 $mg/m^2$, 15 $mg/m^2$, 16 $mg/m^2$, 18 $mg/m^2$, 20 $mg/m^2$, 25 $mg/m^2$, 30 $mg/m^2$, 35 $mg/m^2$, 40 $mg/m^2$, 45 $mg/m^2$, 50 $mg/m^2$ 60 $mg/m^2$, 70 $mg/m^2$, 80 $mg/m^2$, 90 $mg/m^2$, 100 $mg/m^2$, and the like.

In some implementations, the surface density of the silicate multi-metal salt in the negative electrode plate is selected from 0.0005 $g/cm^2$ to 0.5 $g/cm^2$; and optionally, the surface density of the silicate multi-metal salt in the negative electrode plate is selected from 0.001 $g/cm^2$ to 0.3 $g/cm^2$. The surface density of the silicate multi-metal salt in the negative electrode plate may also be selected from any one of the following values or a numerical interval formed by any two of the following values: 0.0005 $g/cm^2$, 0.001 $g/cm^2$, 0.005 $g/cm^2$, 0.01 $g/cm^2$, 0.02 $g/cm^2$, 0.03 $g/cm^2$, 0.04 $g/cm^2$, 0.05 $g/cm^2$, 0.06 $g/cm^2$, 0.07 $g/cm^2$, 0.08 $g/cm^2$, 0.09 $g/cm^2$, 0.1 $g/cm^2$, 0.15 $g/cm^2$, 0.2 $g/cm^2$, 0.25 $g/cm^2$, 0.3 $g/cm^2$, 0.35 $g/cm^2$, 0.4 $g/cm^2$, 0.45 $g/cm^2$, 0.5 $g/cm^2$, and the like.

In some implementations, the negative electrode plate includes the SEI film, the SEI film is located on a surface on a side of the negative electrode active material layer away from the negative electrode current collector, and the SEI film includes the silicate multi-metal salt.

In the negative electrode active material layer, when an addition amount of the silicate multi-metal salt is relatively small, dispersion evenness of the silicate multi-metal salt on a surface of the negative electrode material is reduced, which affects full protection effect for the interface; and when an addition amount of the silicate multi-metal salt is relatively high, too much silicate multi-metal salt is easily enriched at the interface of the material, because the silicate multi-metal salt has a poor conductive ability, a large interface internal resistance is easily generated and performance of the battery cell is deteriorated.

The negative electrode active substance may be selected from materials that have a volume change in a process of deintercalation and intercalation of the active ions (such as the lithium ions, the sodium ions, or the potassium ions) and whose active material interface has a catalytic effect on the electrolytic solution.

In some implementations, the negative electrode active substance may be a negative electrode active substance that is well known for use in the battery in the art. In a non-limitative example, the negative electrode active substance may include one or more of the following materials or substances: artificial graphite, natural graphite, soft carbon, hard carbon, a silicon-based material, a tin-based material, lithium titanium oxide, and the like. The silicon-based material may be one or more selected from monomeric silicon, a silicon oxide, a silicon-carbon complex, a silicon nitrogen complex, and a silicon alloy. The tin-based material may be one or more selected from monomeric tin, a tin oxide, and a tin alloy. However, this application is not limited to these materials or substances, and other conventional materials or substances that may be used as the negative electrode active substance for the battery may also be used. For these negative electrode active substances, only one may be used alone, or more than two may be used in combination.

In some implementations of this application, the negative electrode active material layer includes the negative electrode active substance, and the negative electrode active substance includes one or more of a carbon-based material, a silicon-based material, a silicon-carbon composite material, a tin-based material, and lithium titanate.

In some implementations, the negative electrode active substance, may include, but is not limited to, graphite, soft carbon, hard carbon, an intermediate-phase carbon microsphere, a carbon fiber, a carbon nanotube, monolithic silicon, a silicon oxide, a silicon-carbon complex, lithium titanate, and a material including any of the foregoing substances with a doping element. Further, the negative electrode active substance includes one or more of a transition metal element and a non-transition metal element.

The silicate multi-metal salt in this application can stabilize the electrode-electrolytic solution interface and improve the performance of the battery cell in a plurality of secondary batteries including different types of negative electrode active substances.

In some implementations, the negative electrode active substance includes graphite, and may include one or more of artificial graphite and natural graphite. In some implementations, $D_v50$ of graphite particles may be selected from 8 to 12 μm (such as 10 μm), a specific surface area may be selected from 1.1 to 1.5 $m^2/g$ (such as 1.3 $m^2/g$), and a tap density may be selected from 0 to 1.2 $g/cm^3$ (such as 1.1 $g/cm^3$). In an embodiment, the $D_v50$ of a particle size of the graphite is 10 m, the specific surface area is 1.3 $m^2/g$, and the tap density is 1.1 $g/cm^3$.

In this application, if not otherwise specified, the $D_v50$ is a particle size corresponding to a case in which a cumulative volume distribution percentage of a material reaches 50%, and this parameter indicates that particle sizes of particles occupying 50% of a volume of the material is less than or equal to $D_v50$, and particle sizes of particles occupying 50% of the volume of the material is greater than $D_v50$. The meaning of the $D_v50$ can be understood by a person skilled in the art, and the $D_v50$ can be determined by using instruments and methods known in the art.

In this application, if not otherwise stated, a specific surface area of a particulate matter refers to a ratio of a surface area of the particulate matter to a weight, and may be determined by using instruments and methods known in the art, for example, may be tested by using a nitrogen adsorption specific surface area analysis test method.

In this application, if not otherwise specified, the "tap density" indicates a measured mass per unit volume of a powder tapped under specified conditions, and a unit may be $g/cm^3$.

In some implementations of this application, the secondary battery is the lithium-ion battery, and the negative electrode active substance includes the graphite, and may further include one or more of the artificial graphite and the natural graphite. In some implementations, a mass percentage of the graphite in the negative electrode active substance is greater than 50%. In other implementations, a mass percentage of the graphite in the negative electrode active substance is selected from 70% to 100%. In other implementations, a mass percentage of the graphite in the negative electrode active substance is selected from 80% to 100%. In other implementations, a mass percentage of the graphite in the negative electrode active substance is selected from 90% to 100%. In other implementations, a mass percentage of the graphite in the negative electrode active substance is 100%. The mass percentage of the graphite in the negative electrode active substance may also be selected from any one of the following percentages or a numerical interval formed by any two of the following percentages: 55%, 60%, 65%, 70%, 75%, 80%, 85%, 90%, 95%, 100%, and the like. The graphite may be selected as any suitable specification in the context of this application.

In some implementations of this application, the secondary battery is the lithium-ion battery, and the negative electrode active substance includes the silicon-carbon complex. In some implementations, a mass percentage of the silicon-carbon complex in the negative electrode active substance is greater than 50%. In other implementations, a mass percentage of the silicon-carbon complex in the negative electrode active substance is selected from 70% to 100%. In other implementations, a mass percentage of the silicon-carbon complex in the negative electrode active substance is selected from 80% to 100%. In other implementations, a mass percentage of the silicon-carbon complex in the negative electrode active substance is selected from 90% to 100%. In other implementations, a mass percentage of the silicon-carbon complex in the negative electrode active substance is 100%. The mass percentage of the silicon-carbon complex in the negative electrode active substance may also be selected from any one of the following percentages or a numerical interval formed by any two of the following percentages: 55%, 60%, 65%, 70%, 75%, 80%, 85%, 90%, 95%, 100%, and the like.

In some implementations of this application, the battery is the sodium-ion battery, and the negative electrode active substance includes the hard carbon. In some implementations, a mass percentage of the hard carbon in the negative electrode active substance is greater than 50%. In other implementations, a mass percentage of the hard carbon in the negative electrode active substance is selected from 70% to 100%. In other implementations, a mass percentage of the hard carbon in the negative electrode active substance is selected from 80% to 100%. In other implementations, a mass percentage of the hard carbon in the negative electrode active substance is selected from 90% to 100%. In other implementations, a mass percentage of the hard carbon in the negative electrode active substance is 100%. The mass percentage of the hard carbon in the negative electrode active substance may also be selected from any one of the following percentages or a numerical interval formed by any two of the following percentages: 55%, 60%, 65%, 70%, 75%, 80%, 85%, 90%, 95%, 100%, and the like.

The silicate multi-metal salt of this application may be used to improve performance such as electrode-electrolytic solution interface stability and cycle capacities of a plurality of secondary batteries. Applicable secondary batteries may include, but are not limited to, currently existing lithium-ion secondary batteries. Some non-limitative examples are the foregoing lithium-ion battery in which the negative electrode active substance includes the graphite, lithium-ion battery in which the negative electrode active substance includes the silicon-carbon complex, and the like.

In the active material layer of the electrode plate, when an addition amount of the silicate multi-metal salt is relatively small, dispersion evenness of the silicate multi-metal salt on a surface of the electrode plate material is reduced, which affects full protection effect for the interface; and when an addition amount of the silicate multi-metal salt is relatively high, too much silicate multi-metal salt is easily enriched at the interface of the electrode plate material, because the silicate multi-metal salt has a poor conductive ability, a large interface internal resistance is easily generated and performance of the battery cell is deteriorated.

In a non-limitative example, the negative electrode current collector has two opposite surfaces in a thickness direction of the negative electrode current collector, and the negative electrode film layer is disposed on either or both of the two opposite surfaces of the negative electrode current collector.

In some implementations, the negative electrode current collector may be a metal foil or a composite current collector. For example, as the metal foil, a copper foil may be used. The composite current collector may include a polymer material substrate and a metal layer formed on at least one surface of the polymer material substrate. The composite current collector may be formed by forming a metal material (copper, copper alloy, nickel, nickel alloy, titanium, titanium alloy, silver, silver alloy, and the like) on the polymer material substrate (such as polypropylene (PP), polyethylene terephthalate (PET), polybutylene terephthalate (PBT), polystyrene (PS), or polyethylene (PE)).

In some implementations, the negative electrode film layer further optionally includes a binder. The binder may be one or more selected from styrene butadiene rubber (SBR), polyacrylic acid (PAA), polyacrylic acid sodium (PAAS), polyacrylamide (PAM), polyvinyl alcohol (PVA), sodium alginate (SA), polymethylmethacrylic acid (PMAA), and carboxymethyl chitosan (CMCS).

In some implementations, the negative electrode film layer further optionally includes a conductive agent. The conductive agent may be one or more selected from superconducting carbon, acetylene black, carbon black, Ketjen black, a carbon dot, a carbon nanotube, graphene, and a carbon nanofiber.

In some implementations, the negative electrode film layer further optionally includes other agents, such as a thickener (for example, sodium carboxymethyl cellulose (CMC-Na)).

In some implementations, the negative electrode plate may be prepared according to the following method: The components described above for preparing the negative electrode plate, for example, the negative electrode active material, the silicate multi-metal salt (which may or may not be added), the conductive agent, the binder, and any other components, are dispersed in a solvent (such as deionized water) to form a negative electrode slurry. At least one surface (which may be a single surface or two surfaces) of the negative electrode current collector is coated with the negative electrode slurry. After processes such as drying and compaction (where a manner of cold calendering may be used), the negative electrode plate can be obtained.

Electrolyte

The electrolyte serves to conduct ions between the positive electrode plate and the negative electrode plate. This application uses a liquid electrolyte, in other words, uses an electrolytic solution. The electrolytic solution includes an electrolyte salt and a solvent. In a lithium-ion secondary battery, the electrolyte salt may include an electrolyte lithium salt. In a sodium-ion secondary battery, the electrolyte salt may include an electrolyte sodium salt.

In some implementations, the electrolyte lithium salt may include one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bistrifluoromethanesulfonimide (LiTFSI), lithium trifluoromethanesulfonate ($LiCF_3SO_3$), lithium difluorophosphate, lithium difluoro (oxalato)borate, lithium bis(oxalate)borate (LiBOB), lithium difluoro(bisoxalato)phosphate, and lithium tetrafluoro(oxalato)phosphate.

In some implementations, the electrolyte lithium salt may include one or more of $LiPF_6$, $LiBF_4$, LiBOB, $LiAsF_6$, LiFSI, $LiCF_3SO_3$, $LiClO_4$, and the like.

In some implementations, the electrolyte sodium salt may include one or more of sodium hexafluorophosphate ($NaPF_6$), sodium perchlorate ($NaClO_4$), sodium tetrafluoroborate ($NaBF_4$), sodium bisfluorosulfonimide, sodium bistrifluoromethanesulfonimide, sodium trifluoromethanesulfonate, sodium difluorophosphate, and the like.

In some implementations, the electrolyte sodium salt includes one or more of sodium hexafluorophosphate, sodium perchlorate, sodium tetrafluoroborate, and sodium trifluoromethanesulfonate.

In some implementations, the solvent in the electrolytic solution is an organic solvent. There is no particular limitation on a type of the organic solvent in the electrolytic solution, and the organic solvent may include one or more of a chain carbonate, a cyclic carbonate, a carboxylic ester, and an ether. Types of the chain carbonate, cyclic carbonate, carboxylic ester, and ether are not specifically limited, and may be selected based on actual requirements. In some embodiments, the organic solvent may include one or more of diethyl carbonate, dipropyl carbonate, ethyl methyl carbonate, methyl propyl carbonate, ethyl propyl carbonate, ethylene carbonate, propylene carbonate, butylene carbonate, γ-butyrolactone, methyl formate, ethyl acetate, propyl acetate, methyl propionate, ethyl propionate, tetrahydrofuran, dimethyl ether, diethyl ether, and glycol dimethyl ether.

In some implementations, the organic solvent in the electrolytic solution may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and (ethylsulfonyl)ethane.

In some implementations, the electrolytic solution further optionally includes an additive. For example, the additive may include a negative film-forming additive and a positive film-forming additive. The additive may further include an additive capable of improving specified performance of the battery, for example, an additive for improving overcharge performance of the battery, or an additive for improving high- or low-temperature performance of the battery.

In some implementations, the additives in the electrolytic solution may include one or more of a cyclic carbonate compound containing an unsaturated bond, a halogen-substituted cyclic carbonate compound (where a halogen may include at least one of fluorine, chlorine, and the like), a sulfate compound, a sulfite compound, a sultone compound, a disulfonate compound, a nitrile compound, an aromatic compound, an isocyanate compound, a hosphazene compound, a cyclic anhydride compound, a phosphite compound, a phosphate compound, a borate compound, a carboxylic ester compound, and the like.

Separator

In some implementations, the secondary battery further includes a separator. The type of the separator is not particularly limited in this application, and may be any well-known separator with a porous structure that has good chemical stability and mechanical stability. For batteries of different systems, different diameters of active ions cause different requirements on a structure of the separator. For example, diameters of sodium and lithium ions are different in sodium-ion and lithium-ion batteries, and the sodium ion has a larger diameter.

In some implementations, a material of the separator may be selected from fiberglass, non-woven fabric, polyethylene, polypropylene, and polyvinylidene fluoride. The separator may be a single-layer film, and may also be a multilayer composite film, without being particularly limited. When the separator is the multilayer composite film, materials of layers may be the same or different, without being particularly limited.

Electrode Assembly and Secondary Battery

In some implementations, the positive electrode plate, the negative electrode plate and the separator may be made into an electrode assembly through a winding process or a stacking process.

In some implementations, the secondary battery may include an outer package. The outer package may be configured to package the foregoing electrode assembly and the electrolyte.

In some implementations, the outer package of the secondary battery may be a hard shell such as a hard plastic shell, an aluminum shell, a steel shell, or the like. The outer package of the secondary battery may also be a soft package such as a pouch-type soft package. The soft package may be made of plastic such as polypropylene, polybutylene terephthalate, or polybutylene succinate.

The shape of the secondary battery is not particularly limited in this application, and may be cylindrical, prismatic or any other shape. For example, FIG. 1 is an example of a secondary battery 5 of a square structure.

Figure 2:
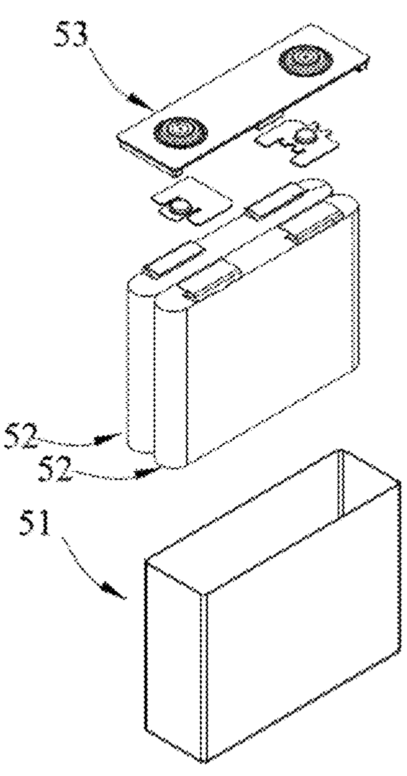
FIG. 2 is an exploded view of the secondary battery according to an embodiment of this application shown in FIG. 1.

In some implementations, referring to FIG. 2, an outer package may include a shell 51 and a cover plate 53. The shell 51 may include a bottom plate and side plates connected to the bottom plate, and an accommodating cavity is enclosed by the bottom plate and the side plates. The shell 51 is provided with an opening communicating with the accommodating cavity, and the cover plate 53 may cover the opening to close the accommodating cavity. A positive electrode plate, a negative electrode plate and a separator may form an electrode assembly 52 through a winding process or a stacking process. The electrode assembly 52 is packaged in the accommodating cavity. The electrode assembly 52 is infiltrated with an electrolytic solution. There may be one or more electrode assemblies 52 in the secondary battery 5, which may be selected by a person skilled in the art according to practical needs.

According to a second aspect, an electrical apparatus is provided, and includes the secondary battery according to the first aspect of this application.

Use of the secondary battery in the first aspect of this application in the electrical apparatus can utilize an interface stabilization effect of the foregoing special silicate multi-metal salt to improve the cycle performance and prolong the service life.

The secondary battery described in the first aspect of this application may be used as a power supply of the electrical apparatus or as an energy storage unit of the electrical apparatus. The electrical apparatus may include, but is not limited to, a mobile device, an electric vehicle, an electric train, a ship and a satellite, an energy storage system, and the like. For example, the mobile device may be, but is not limited to, a mobile phone, or a laptop computer. The electric vehicle may be, for example, but is not limited to, a pure electric vehicle, a hybrid electric vehicle, a plug-in hybrid electric vehicle, an electric bicycle, an electric scooter, an electric golf cart, or an electric truck.

As the electrical apparatus, the secondary battery may be selected according to the use needs of the electrical apparatus.

Figure 3:
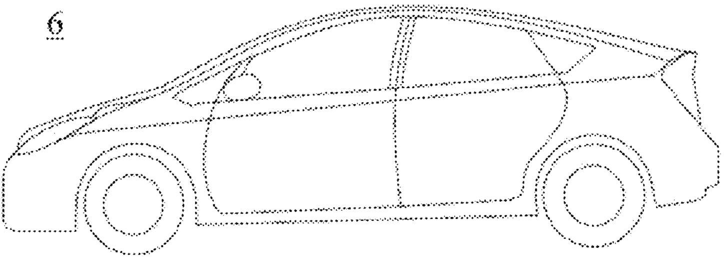
FIG. 3 is a schematic diagram of an electrical apparatus in which a secondary battery is used as a power supply according to an embodiment of this application.

FIG. 3 shows an example of an electrical apparatus 6. The electrical apparatus is a pure electric vehicle, a hybrid electric vehicle, a plug-in hybrid electric vehicle, or the like.

As another example, a device may be a mobile phone, a tablet computer, a laptop computer, or the like. The device is typically required to be thin and light, and may use the secondary battery as a power supply.

According to a third aspect, an application of a silicate multi-metal salt in preparation of a secondary battery is provided, where the silicate multi-metal salt is as defined in the first aspect of this application.

In some implementations of this application, the application includes at least one of preparation of a positive electrode plate including the silicate multi-metal salt and preparation of a negative electrode plate including the silicate multi-metal salt.

In some implementations, the application includes the preparation of the positive electrode plate including the silicate multi-metal salt.

In some implementations, the application includes the preparation of the negative electrode plate including the silicate multi-metal salt.

In some implementations, the application includes the preparation of the positive electrode plate including the silicate multi-metal salt and the preparation of the negative electrode plate including the silicate multi-metal salt.

The foregoing special silicate multi-metal salt is used to prepare the secondary battery (including but not limited to the secondary battery described in the first aspect of this application). The silicate multi-metal salt can improve infiltration performance of an electrolytic solution, increase electrode-electrolytic solution interface stability, improve a battery cycle capacity, and extend use of the battery.

In some implementations of this application, the preparation of the positive electrode plate including the silicate multi-metal salt includes: At least one surface of a positive electrode current collector is coated with a positive electrode slurry, and drying and compaction (where a manner of cold calendering may be used) are performed, where the positive electrode slurry includes a positive electrode active substance, the silicate multi-metal salt (which may be selected from any suitable silicate multi-metal salt of this application), a conductive agent, a binder, and a solvent. For definitions of the positive electrode active substance, the conductive agent, the binder, and the solvent, refer to the first aspect.

In some implementations, in the positive electrode slurry, a mass percentage of the silicate multi-metal salt relative to the positive electrode active substance is selected from 0.001% to 2%; optionally, the mass percentage of the silicate multi-metal salt relative to the positive electrode active substance is selected from 0.01% to 2%; and optionally, the mass percentage of the silicate multi-metal salt relative to the positive electrode active substance is selected from 0.1% to 2%. In the positive electrode slurry, the mass percentage of the silicate multi-metal salt relative to the positive electrode active substance may also be selected from any one of the following percentages or a numerical interval formed by any two of the following percentages: 0.001%, 0.005%, 0.01%, 0.05%, 0.1%, 0.2%, 0.3%, 0.4%, 0.5%, 0.6%, 0.7%, 0.8%, 0.9%, 1.0%, 1.2%, 1.4%, 1.5%, 1.6%, 1.8%, 2%, and the like.

In some implementations, in the positive electrode slurry, a ratio of a mass of the silicate multi-metal salt relative to a specific surface area of the positive electrode active substance is selected from 0.01 $mg/m^2$~100 $mg/m^2$; and optionally, the ratio of the mass of the silicate multi-metal salt relative to the specific surface area of the positive electrode active substance is selected from 0.1 $mg/m^2$~30 $mg/m^2$. In the positive electrode slurry, the ratio of the mass of the silicate multi-metal salt relative to the specific surface area of the positive electrode active substance may also be selected from any one of the following values or a numerical interval formed by any two of the following values: 0.01 $mg/m^2$, 0.05 $mg/m^2$, 0.1 $mg/m^2$, 0.5 $mg/m^2$, 1 $mg/m^2$, 2 $mg/m^2$, 3 $mg/m^2$, 4 $mg/m^2$, 5 $mg/m^2$, 6 $mg/m^2$, 8 $mg/m^2$, 10 $mg/m^2$, 12 $mg/m^2$, 15 $mg/m^2$, 16 $mg/m^2$, 18 $mg/m^2$, 20 $mg/m^2$, 25 $mg/m^2$, 30 $mg/m^2$, 35 $mg/m^2$, 40 $mg/m^2$, 45 $mg/m^2$, 50 $mg/m^2$ 60 $mg/m^2$, 70 $mg/m^2$, 80 $mg/m^2$, 90 $mg/m^2$, 100 $mg/m^2$, and the like.

In some implementations, a surface density of the silicate multi-metal salt in the positive electrode plate is selected from 0.001 $g/cm^2$ to 0.5 $g/cm^2$; and optionally, the surface density of the silicate multi-metal salt in the positive electrode plate is selected from 0.01 $g/cm^2$ to 0.1 $g/cm^2$. Reference may also be made to the first aspect of this application.

In some implementations of this application, the preparation of the negative electrode plate including the silicate multi-metal salt includes: At least one surface of a negative electrode current collector is coated with a negative electrode slurry, and drying and compaction are performed, where the negative electrode slurry includes a negative electrode active substance, the silicate multi-metal salt (which may be selected from any suitable silicate multi-metal salt of this application), a conductive agent, a binder, and a solvent. For definitions of the negative electrode active substance, the conductive agent, the binder, and the solvent, refer to the first aspect.

In some implementations, in the negative electrode slurry, a mass percentage of the silicate multi-metal salt relative to the negative electrode active substance is selected from 0.005% to 5%; optionally, the mass percentage of the silicate multi-metal salt relative to the negative electrode active substance is selected from 0.02% to 3%; and optionally, the mass percentage of the silicate multi-metal salt relative to the negative electrode active substance is selected from 0.1% to 3%. In the negative electrode slurry, the mass percentage of the silicate multi-metal salt relative to the negative electrode active substance may also be selected from any one of the following percentages or a numerical interval formed by any two of the following percentages: 0.005%, 0.01%, 0.02%, 0.04%, 0.05%, 0.06%, 0.08%, 0.1%, 0.2%, 0.3%, 0.4%, 0.5%, 0.6%, 0.7%, 0.8%, 0.9%, 1.0%, 1.2%, 1.4%, 1.5%, 1.6%, 1.8%, 2%, 2.5%, 3%, 3.5%, 4%, 4.5%, 5%, and the like.

In some implementations, in the negative electrode slurry, a ratio of a mass of the silicate multi-metal salt relative to a specific surface area of the negative electrode active substance is selected from 0.01 to 100 $mg/m^2$; and optionally, the ratio of the mass of the silicate multi-metal salt relative to the specific surface area of the negative electrode active substance is selected from 0.1 to 30 $mg/m^2$. In the negative electrode slurry, the ratio of the mass of the silicate multi-metal salt relative to the specific surface area of the negative electrode active substance may also be selected from any one of the following values or a numerical interval formed by any two of the following values: 0.01 $mg/m^2$, 0.05 $mg/m^2$, 0.1 $mg/m^2$, 0.5 $mg/m^2$, 1 $mg/m^2$, 2 $mg/m^2$, 3 $mg/m^2$, 4 $mg/m^2$, 5 $mg/m^2$, 6 $mg/m^2$, 8 $mg/m^2$, 10 $mg/m^2$, 12 $mg/m^2$, 15 $mg/m^2$, 16 $mg/m^2$, 18 $mg/m^2$, 20 $mg/m^2$, 25 $mg/m^2$, 30 $mg/m^2$, 35 $mg/m^2$, 40 $mg/m^2$, 45 $mg/m^2$, 50 $mg/m^2$ 60 $mg/m^2$, 70 $mg/m^2$, 80 $mg/m^2$, 90 $mg/m^2$, 100 $mg/m^2$, and the like.

In some implementations, a surface density of the silicate multi-metal salt in the positive electrode plate is selected from 0.001 to 0.5 $g/cm^2$; and optionally, the surface density of the silicate multi-metal salt in the positive electrode plate is selected from 0.01 to 0.1 $g/cm^2$. Reference may also be made to the first aspect of this application.

A plurality of silicate multi-metal salts used in this application have excellent three-dimensional spatial structures, and have excellent physicochemical properties in one or more of the following aspects: spreadability, viscosity increase, film-forming assistance, thickening, rheology, thixotropy, suspension, colloidal thixotropy, a function of an emulsification stabilizer, and the like. Adding the special silicate multi-metal salt to the positive electrode slurry or the negative electrode slurry increases system stability of the positive electrode slurry or the negative electrode slurry, improves film layer evenness of the slurry applied on the positive electrode current collector or the negative electrode current collector, and improves quality stability of the electrode and the secondary battery.

In some implementations of this application, the secondary battery is as defined in the first aspect of this application. The secondary battery obtained through the preparation of the third aspect of this application may be any suitable secondary battery of the first aspect of this application, and has a feature of a long life.

According to another aspect of this application, a positive electrode slurry is provided and includes a positive electrode active substance, a silicate multi-metal salt, a conductive agent, a binder, and a solvent, where the silicate multi-metal salt is as defined in the first aspect of this application. The positive electrode slurry may be prepared by using the methods described above.

According to another aspect of this application, a method for preparing a positive electrode plate is provided, and includes the following steps: coating at least one surface of a positive electrode current collector with the foregoing positive electrode slurry, drying, and compacting (where a manner of cold calendering may be used). Reference may also be made to the foregoing preparation method.

According to another aspect of this application, a negative electrode slurry is provided and includes a negative electrode active substance, a silicate multi-metal salt, a conductive agent, a binder, and a solvent, where the silicate multi-metal salt is as defined in the first aspect of this application. The negative electrode slurry may be prepared by using the methods described above.

According to another aspect of this application, a method for preparing a negative electrode plate is provided, and includes the following steps: coating at least one surface of a negative electrode current collector with the foregoing negative electrode slurry, drying, and compacting (where a manner of cold calendering may be used). Reference may also be made to the foregoing preparation method.

In the following, some embodiments of this application are described. The embodiments described below are exemplary merely for the purpose of explaining this application, and shall not be construed as limiting this application. Where technologies or conditions are not indicated in embodiments, follow the descriptions above, or follow technologies or conditions described in documents in the art or a product specification. Reagents or instruments used without indication of manufacturers are commercially available conventional products, or may alternatively be synthesized based on the commercially available products in a conventional manner.

In the following examples, if not specifically specified, a graphite raw material used for a negative electrode active substance is artificial graphite, with a particle size $D_v50$ of 10 μm, a specific surface area of 1.3 $m^2/g$, and a tap density of 1.1 $g/cm^3$; and a silicone-containing material used for the negative electrode active substance is purchased from BTR New Material Group Co., Ltd, with a model number of S500.

In the following examples, if not specifically specified, an amount of a silicate additive in a positive electrode plate in Part 1.1. is a mass percentage relative to a positive electrode active substance (such as lithium iron phosphate or NCM811), an amount of a silicate additive in a negative electrode plate in Part 1.2. is a mass percentage relative to a negative electrode active substance (such as artificial graphite or a silicon-carbon composite material), and an amount of a silicate additive in an electrolytic solution in Part 1.3. is a mass percentage relative to the electrolytic solution.

In the following, "wt %" refers to a mass percentage.

1. Preparation Example

1.1. Preparation of a Positive Electrode Plate

LFP0 positive electrode plate: Lithium iron phosphate as a positive electrode active substance, acetylene black as a conductive agent, and polyvinylidene fluoride (PVDF) as a binder are dissolved into N-methylpyrrolidone (NMP) as a solvent at a weight ratio of 90:5:5, and are stirred and mixed sufficiently and evenly to obtain a positive electrode slurry. Then, a unilateral surface of a positive electrode current collector is evenly coated with the positive electrode slurry, and then drying, cold calendering, and slitting are performed, to obtain the positive electrode plate.

LFP1 positive electrode plate: Lithium iron phosphate as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 1% of magnesium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

LFP2 positive electrode plate: Lithium iron phosphate as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 1% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM0 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved in N-methylpyrrolidone (NMP) as a solvent at a weight ratio of 90:5:5, and are stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM1 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 0.01% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM2 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 0.1% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM3 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 1% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM4 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 3% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

NCM5 positive electrode plate: $LiNi_{0.8}Co_{0.1}Mn_{0.1}O_2$ (NCM811) as a positive electrode active substance, acetylene black as a conductive agent, and polyvinylidene fluoride (PVDF) as a binder are dissolved into N-methylpyrrolidone (NMP) as a solvent at a weight ratio of 90:5:5, then 5% of lithium aluminum silicate is added, and a mixture is stirred and mixed sufficiently and evenly to obtain a positive electrode slurry. Then, a positive electrode current collector is evenly coated with the positive electrode slurry, and then drying, cold calendering, and slitting are performed, to obtain the positive electrode plate.

1.2. Preparing a Negative Electrode Plate

Gr0 negative electrode plate: Artificial graphite (with a particle size $D_v50$ of 10 μm, a specific surface area of 1.3 $m^2/g$, and a tap density of 1.1 $g/cm^3$) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed with the deionized water as the solvent to prepare a negative electrode slurry. Then, both sides of copper foil as a negative electrode current collector are evenly coated with the negative electrode slurry once or more times, drying is performed to obtain a negative electrode diaphragm, and then cold calendering and slitting are performed to obtain the negative electrode plate.

Gr1 negative electrode plate: Artificial graphite (same as graphite as the raw material of Gr0) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed with the deionized water as the solvent, and 1% of magnesium aluminum silicate is added, to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Gr2 negative electrode plate: Artificial graphite (same as graphite as the raw material of Gr0) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed with the deionized water as the solvent, and 1% of beryllium aluminum silicate is added, to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Gr3 negative electrode plate: Artificial graphite (same as graphite as the raw material of Gr0) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed with the deionized water as the solvent, and 1% of magnesium boron silicate is added, to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Gr4 negative electrode plate: Artificial graphite (same as graphite as the raw material of Gr0) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed with the deionized water as the solvent, and 1% of sodium aluminum silicate is added, to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Si0 negative electrode plate: A silicon-carbon composite material (BTR New Material Group Co., Ltd S500) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, and are evenly mixed to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Si1 negative electrode plate: A silicon-carbon composite material (BTR New Material Group Co., Ltd S500) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, 1% of magnesium aluminum silicate is added, and a mixture is evenly mixed to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Si2 negative electrode plate: A silicon-carbon composite material (BTR New Material Group Co., Ltd S500) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, 1% of magnesium phosphorus silicate is added, and a mixture is evenly mixed to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Si3 negative electrode plate: A silicon-carbon composite material (BTR New Material Group Co., Ltd S500) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, then 1% of manganese aluminum silicate is added, and a mixture is evenly mixed to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

Si4 negative electrode plate: A silicon-carbon composite material (BTR New Material Group Co., Ltd S500) as an active substance, acetylene black as a conductive agent, styrene-butadiene rubber (SBR) as a binder, and sodium carboxymethyl cellulose as a thickener are dissolved into deionized water as a solvent at a weight ratio of 90:4:4:2, then 1% of aluminum silicate is added, and a mixture is evenly mixed to prepare a negative electrode slurry. Then, copper foil as a negative electrode current collector is evenly coated with the negative electrode slurry once or more times, drying is performed to obtain a negative electrode diaphragm, and then cold calendering and slitting are performed to obtain the negative electrode plate.

1.3. Preparing an Electrolytic Solution

EL0 electrolytic solution: In an argon atmosphere glove box ($H_2O$<0.1 ppm and $O_2$<0.1 ppm), organic solvents EC and EMC are evenly mixed at a volume ratio of 3/7, 12.5 wt % of LiPF6 lithium salt is added and dissolved in the organic solvents, and 1 wt % of PS, 0.5 wt % of DTD, 0.5 wt % of VC, and 2 wt % of FEC are added as additives and evenly stirred, to obtain a corresponding electrolytic solution.

EL1 electrolytic solution: In an argon atmosphere glove box ($H_2O$<0.1 ppm and $O_2$<0.1 ppm), organic solvents EC and EMC are evenly mixed at a volume ratio of 3/7, 12.5 wt % of LiPF6 lithium salt is added and dissolved in the organic solvents, and 1 wt % of PS, 0.5 wt % of DTD, 0.5 wt % of VC, and 2 wt % of FEC are added as additives and evenly stirred. Then, magnesium aluminum silicate of which a mass percentage is 1 wt % in an electrolytic solution is added, and even stirring and centrifugation are performed to obtain a supernatant, so as to obtain the corresponding electrolytic solution. In a preparation process, it can be observed that a dissolution amount of the magnesium aluminum silicate is small.

PS is 1,3-propane sultone; DTD is ethylene sulfate; VC is vinylene carbonate; and FEC is fluoroethylene carbonate.

TABLE 1

| Number | Type | Electrode plate active substance | Silicate additive | Mass percentage relative to electrode plate active substance |
|---|---|---|---|---|
| LFP0 | Positive electrode | Lithium iron phosphate | / | 0 |
| LFP1 | Positive electrode | Lithium iron phosphate | Magnesium aluminum silicate | 1% |
| LFP2 | Positive electrode | Lithium iron phosphate | Lithium aluminum silicate | 1% |
| NCM0 | Positive electrode | NCM | / | 0 |
| NCM1 | Positive electrode | NCM | Lithium aluminum silicate | 0.01% |
| NCM2 | Positive electrode | NCM | Lithium aluminum silicate | 0.1% |
| NCM3 | Positive electrode | NCM | Lithium aluminum silicate | 1% |
| NCM4 | Positive electrode | NCM | Lithium aluminum silicate | 3% |
| NCM5 | Positive electrode | NCM | Lithium aluminum silicate | 5% |
| Gr0 | Negative electrode | Artificial graphite | / | 0 |
| Gr1 | Negative electrode | Artificial graphite | Magnesium aluminum silicate | 1% |
| Gr2 | Negative electrode | Artificial graphite | Beryllium aluminum silicate | 1% |
| Gr3 | Negative electrode | Artificial graphite | Magnesium boron silicate | 1% |
| Gr4 | Negative electrode | Artificial graphite | Sodium aluminum silicate | 1% |
| Si0 | Negative electrode | Silicon-carbon composite material | / | 0 |
| Si1 | Negative electrode | Silicon-carbon composite material | Magnesium aluminum silicate | 1% |
| Si2 | Negative electrode | Silicon-carbon composite material | Magnesium phosphorus silicate | 1% |
| Si3 | Negative electrode | Silicon-carbon composite material | Manganese aluminum silicate | 1% |
| Si4 | Negative electrode | Silicon-carbon composite material | Aluminum silicate (silicate mono-metal salt) | 1% |
| EL0 | Electrolytic solution | | / | 0 |
| EL1 | Electrolytic solution | | Magnesium aluminum silicate | 1% (Mass concentration in electrolytic solution) |

1.4. Separator

The separator is a commercial PP separator.

1.5. Assembly of a Lithium-Ion Battery

According to Table 2, a corresponding positive electrode plate, a separator, and a corresponding negative electrode plate are stacked in order, so that the separator is located between the positive and negative electrode plates for separation, and then wounding is performed to obtain an electrode assembly. The electrode assembly is disposed in a battery shell, a corresponding electrolytic solution is injected after drying is performed, and then processes such as chemical formation and standing are performed to obtain the lithium-ion battery, which is denoted as a lithium-ion battery in an initial state.

2. Parameter and Performance Test 2.1. Internal Resistance of a Battery Cell Before and After Cycling Lithium-ion batteries to be tested: a lithium-ion battery in an initial state and a lithium-ion battery with 1000 cycles at 45° C. (referring to a cycling condition in Part 2.2).

Test Method: At 25° C., the lithium-ion batteries to be tested are charged at 1 C constant current to 4.3V, then charged at 4.3V constant voltage until the current is less than 0.05 C, and then discharged at 1 C for 30 min, that is, electricity of battery cells are adjusted to 50% SOC. Then, positive and negative pens of a TH2523A alternating current internal resistance tester are in contact with positive and negative electrode plates of the batteries respectively, and internal resistance values of the batteries are read through the internal resistance tester. An obtained internal resistance value of the lithium-ion battery in the initial state during the test is denoted as "an initial internal resistance of the battery cell", and an obtained internal resistance value of the lithium-ion battery with 1000 cycles at 45° C. is denoted as "an internal resistance of the battery cell after 1000 cycles", with a unit of mΩ.

2.2. Capacity Retention Rate for 1000 Cycles at 45° C.

At 45° C., charging a lithium-ion battery at a constant current of 1 C to 4.3 V, charging same at a constant voltage of 4.3 V until the current is less than 0.05 C, and discharging the lithium-ion battery at a constant current of 1 C to 3.0 V, the above being a charging and discharging process. Charging and discharging are repeated in this way to calculate a capacity retention rate of the lithium-ion battery after 800 cycles.

Capacity retention rate (%) of the lithium-ion battery after 1000 cycles at 45° C.=(Discharge capacity of the 1000th cycle/Discharge capacity of the 1st cycle)×100%.

2.3. Capacity Retention Rate for 300 Days of Storage at 60° C.

At 25° C., charging a lithium-ion battery at a constant current of 1 C until a voltage reaches 4.3 V, charging same at the constant voltage of 4.3 V until the current is less than 0.05 C, and discharging same at a constant current of 1 C to 3.0 V, the above being a charging and discharging process, and at this time, lithium being tested. Putting the fully charged lithium-ion battery into a constant temperature box at 60° C. to test a capacity after storage for 300 days.

Capacity Retention Rate (%) of the Lithium-Ion Battery after 300 Days of Storage at 60° C.=(Discharge Capacity after 300 Days of Storage/Discharge Capacity of the 1st Cycle)×100%.

3. Test Results and Analysis

Test results of an electrode plate and a secondary battery may refer to Table 2. According to Table 2, introduction of a silicate multi-metal salt of this application into at least one of a positive electrode plate and a negative electrode plate in Embodiments 1 to 22 significantly improves stability of an electrode-electrolytic solution interface, and significantly improves a cycle capacity retention rate and a storage capacity retention rate compared with those in Comparative embodiments 1 to 7. It can be seen that the introduction of the silicate multi-metal salt in the electrode plate greatly improves cycle stability and capacity usage of a battery cell.

In Comparative embodiment 1, conventional lithium iron phosphate as a positive electrode and graphite as a negative electrode are used in a lithium-ion battery, and the silicate multi-metal salt of this application as an additive is not introduced as an interfacial stabilizer. In this case, impedance before and after cycling is large, and deterioration of a cycle capacity retention rate is serious.

In Comparative embodiment 2, conventional NCM as a positive electrode and a silicone-containing negative electrode are used in a lithium-ion battery, and the silicate multi-metal salt of this application as an additive is not introduced as an interfacial stabilizer. In this case, impedance before and after cycling is large and deterioration is serious, and cycle and storage capacity retention rates are serious.

In Comparative embodiment 3 to 5, another silicate additive replacing the silicate multi-metal salt of this application as an additive is used in a lithium-ion battery. In this case, impedance of a battery cell and capacity retention rates during cycle and storage processes are not improved, but deteriorated. In Embodiments 18 and 19, addition of the silicate multi-metal salt of this application to a positive electrode plate significantly improves deterioration caused by negative electrode plate additives (other types of silicate multi-metal salts or silicate mono-metal salts: magnesium phosphorus silicate, manganese aluminum silicate, and aluminum silicate) on performance of a battery cell.

In Comparative embodiments 6 and 7, both a positive electrode plate and a negative electrode plate of a lithium-ion battery are not added with the silicate multi-metal salt this application as an additive, and the silicate multi-metal salt of this application as the additive is added to only an electrolyte. In this case, internal resistance before and after cycling, a capacity retention rate with 1,000 cycles at 45° C., and a capacity retention rate of storage at 60° C. for 300 days shown in Table 2 are slightly or not improved.

TABLE 2

| Case number | Positive electrode Number | Negative electrode Number | Electrolytic solution Number | Initial internal resistance of battery cell (mΩ) | Internal resistance of battery cell after 1000 cycles (mΩ) | Capacity retention rate % after 1000 cycles at 45° C. | Capacity retention rate of storage at 60° C. after 300 days |
|---|---|---|---|---|---|---|---|
| Embodiment 1 | LFP0 | Gr1 | EL0 | 850 | 1005 | 47 | 35 |
| Embodiment 2 | LFP0 | Gr2 | EL0 | 850 | 1008 | 46 | 35 |
| Embodiment 3 | LFP0 | Gr3 | EL0 | 847 | 1003 | 48 | 33 |
| Embodiment 4 | LFP0 | Gr4 | EL0 | 850 | 1008 | 45 | 34 |
| Embodiment 5 | LFP1 | Gr0 | EL0 | 850 | 1006 | 48 | 35 |
| Embodiment 6 | LFP2 | Gr0 | EL0 | 845 | 1002 | 45 | 31 |
| Embodiment 7 | LFP1 | Gr1 | EL0 | 837 | 985 | 53 | 38 |
| Embodiment 8 | LFP1 | Gr2 | EL0 | 836 | 989 | 50 | 40 |
| Embodiment 9 | LFP1 | Gr3 | EL0 | 837 | 988 | 55 | 40 |
| Embodiment 10 | LFP1 | Gr4 | EL0 | 833 | 988 | 54 | 38 |
| Embodiment 11 | NCM1 | Si0 | EL0 | 1108 | 1918 | 23 | 15 |
| Embodiment 12 | NCM2 | Si0 | EL0 | 1100 | 1917 | 24 | 16 |
| Embodiment 13 | NCM3 | Si0 | EL0 | 1090 | 1890 | 31 | 23 |
| Embodiment 14 | NCM4 | Si0 | EL0 | 1091 | 1891 | 32 | 24 |
| Embodiment 15 | NCM5 | Si0 | EL0 | 1103 | 1911 | 25 | 16 |
| Embodiment 16 | NCM0 | Si1 | EL0 | 1095 | 1894 | 30 | 23 |
| Embodiment 17 | NCM3 | Si1 | EL0 | 1084 | 1879 | 37 | 28 |
| Embodiment 18 | NCM3 | Si2 | EL0 | 1100 | 1916 | 25 | 13 |
| Embodiment 19 | NCM3 | Si3 | EL0 | 1110 | 1926 | 22 | 10 |
| Embodiment 20 | NCM3 | Si4 | EL0 | 1114 | 1930 | 20 | 9 |
| Embodiment 21 | LFP1 | Gr1 | EL1 | 839 | 987 | 54 | 39 |
| Embodiment 22 | NCM3 | Si1 | EL1 | 1085 | 1877 | 36 | 27 |
| Comparative Embodiment 1 | LFP0 | Gr0 | EL0 | 870 | 1049 | 31 | 21 |
| Comparative Embodiment 2 | NCM0 | Si0 | EL0 | 1110 | 1929 | 20 | 10 |
| Comparative Embodiment 3 | NCM0 | Si2 | EL0 | 1111 | 1931 | 18 | 8 |
| Comparative Embodiment 4 | NCM0 | Si3 | EL0 | 1121 | 1941 | 15 | 5 |
| Comparative Embodiment 5 | NCM0 | Si4 | EL0 | 1125 | 1945 | 13 | 4 |
| Comparative Embodiment 6 | LFP0 | Gr0 | EL1 | 871 | 1052 | 30 | 22 |

TABLE 2-continued

| Case number | Positive electrode Number | Negative electrode Number | Electrolytic solution Number | Initial internal resistance of battery cell (mΩ) | Internal resistance of battery cell after 1000 cycles (mΩ) | Capacity retention rate % after 1000 cycles at 45° C. | Capacity retention rate of storage at 60° C. after 300 days |
|---|---|---|---|---|---|---|---|
| Comparative Embodiment 7 | NCM0 | Si0 | EL1 | 1111 | 1928 | 21 | 11 |

Various technical features of the foregoing embodiments may be combined arbitrarily, and all possible combinations of the various technical features of the foregoing embodiments have not been described for the sake of concise description; however, as long as there is no conflict in the combinations of these technical features, they shall all be regarded as falling within the scope of this specification.

It is hereby noted that this application is not limited to the foregoing implementations. The foregoing implementations are merely examples. Any and all implementations with substantively the same constituents or exerting the same effects as the technical ideas hereof without departing from the scope of the technical solutions of this application still fall within the technical scope of this application. The foregoing embodiments express only several implementations of this application, which are described in detail, but are not to be construed as a limitation on the scope of the patent. In addition, all kinds of variations of the implementations conceivable by a person skilled in the art and any other implementations derived by combining some constituents of the implementations hereof without departing from the scope of the subject-matter of this application still fall within the scope of this application. It is hereby indicated that for a person of ordinary skill in the art, many variations and improvements may further be made without departing from the conception of this application, all of which fall within the scope of protection of this application. Therefore, the scope of protection of this application shall be subject to the attached claims, and the specification and the accompanying drawings may be used to interpret content of the claims.

What is claimed is:

1. A secondary battery, comprising a positive electrode plate, a negative electrode plate, a separator, and an electrolytic solution, wherein the separator is located between the positive electrode plate and the negative electrode plate, the positive electrode plate comprises a positive electrode active material layer, and the negative electrode plate comprises a negative electrode active material layer;

at least one of the positive electrode active material layer and the negative electrode active material layer comprises a silicate multi-metal salt; and when the positive electrode active material layer comprises the silicate multi-metal salt, the positive electrode active material layer comprises a positive electrode active substance and the silicate multi-metal salt;

when the negative electrode active material layer comprises the silicate multi-metal salt, the negative electrode active material layer comprises a negative electrode active substance and the silicate multi-metal salt, where the negative electrode active substance comprises one or more of artificial graphite, natural graphite, soft carbon, hard carbon, or a silicon-based material, and the silicon-based material is selected from one or more of monomeric silicon, a silicon oxide, a silicon-carbon complex, a silicon nitrogen complex, or a silicon alloy; and a chemical formula of the silicate multi-metal salt is at least one selected from $YSi_2Z^1Z^2O_8$ and $X^1X^2Si_2Z^1Z^2O_8$, where Y is selected from second main group elements;

$X^1$ and $X^2$ are each independently selected from first main group elements; and $Z^1$ and $Z^2$ are each selected from third main group elements.

2. The secondary battery according to claim 1, wherein a structural formula of the silicate multi-metal salt is at least one selected from Formula I and Formula II:

I

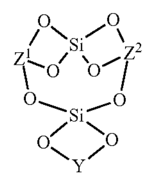

II

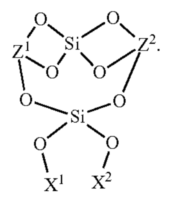

3. The secondary battery according to claim 1, wherein the secondary battery satisfies any one or more of the following characteristics:

Y is Mg or Be;

$X^1$ and $X^2$ are each independently Li or Na;

wherein when $X^1$ is Li, $X^2$ is Li and when $X^1$ is Na, $X^2$ is Na;

$Z^1$ and $Z^2$ are each independently Al or B; and wherein when $Z^1$ is Al, $Z^2$ is Al and when $Z^1$ is B, $Z^2$ is B.

4. The secondary battery according to claim 1, wherein the silicate multi-metal salt comprises one or more of magnesium aluminum silicate, magnesium boron silicate, beryllium aluminum silicate, beryllium boron silicate, lithium aluminum silicate, lithium boron silicate, sodium aluminum silicate, and sodium boron silicate.

5. The secondary battery according to claim 1, wherein the positive electrode active material layer comprises the positive electrode active substance and the silicate multi-metal salt; and the positive electrode active material layer satisfies one or more of the following characteristics:

in the positive electrode active material layer, a mass percentage of the silicate multi-metal salt relative to the positive electrode active substance is selected from 0.001% to 2%;

in the positive electrode active material layer, a ratio of a mass of the silicate multi-metal salt relative to a specific surface area of the positive electrode active substance is selected from 0.01 $mg/m^2$ to 100 $mg/m^2$;

a surface density of the silicate multi-metal salt in the positive electrode plate is selected from 0.001 $g/cm^2$ to 0.5 $g/cm^2$.

6. The secondary battery according to claim 1, wherein the secondary battery is a lithium-ion secondary battery or a sodium-ion secondary battery.

7. The secondary battery according to claim 6, wherein the positive electrode active substance comprises a lithium-ion material; and the lithium-ion material comprises at least one of a lithium-containing phosphate and a lithium transition metal oxide.

8. The secondary battery according to claim 1, wherein the negative electrode active material layer comprises the negative electrode active substance and the silicate multi-metal salt; and the negative electrode active material layer satisfies one or more of the following characteristics:

in the negative electrode active material layer, a mass percentage of the silicate multi-metal salt relative to the negative electrode active substance is selected from 0.005% to 5%;

in the negative electrode active material layer, a ratio of a mass of the silicate multi-metal salt relative to a specific surface area of the negative electrode active substance is selected from 0.01 $mg/m^2$ to 100 $mg/m^2$;

a surface density of the silicate multi-metal salt in the negative electrode plate is selected from 0.0005 $g/cm^2$ to 0.5 $g/cm^2$.

9. The secondary battery according to claim 1, wherein the secondary battery is a lithium-ion battery, and the negative electrode active substance comprises graphite.

10. The secondary battery according to claim 1, wherein the secondary battery is a lithium-ion battery, and the negative electrode active substance comprises a silicon-carbon complex.

11. An electrical apparatus, comprising the secondary battery according to claim 1.

12. Application of the silicate multi-metal salt in preparation of a secondary battery, wherein the silicate multi-metal salt is as defined in claim 1;

the application comprises at least one of preparation of the positive electrode plate comprising the silicate multi-metal salt and preparation of the negative electrode plate comprising the silicate multi-metal salt;

the positive electrode plate comprises the positive electrode active material layer, and the negative electrode plate comprises the negative electrode active material layer; and at least one of the positive electrode active material layer and the negative electrode active material layer comprises the silicate multi-metal salt;

when the positive electrode active material layer comprises the silicate multi-metal salt, the positive electrode active material layer comprises the positive electrode active substance and the silicate multi-metal salt;

when the negative electrode active material layer comprises the silicate multi-metal salt, the negative electrode active material layer comprises the negative electrode active substance and the silicate multi-metal salt, where the negative electrode active substance comprises one or more of artificial graphite, natural graphite, soft carbon, hard carbon, or the silicon-based material, and the silicon-based material is selected from one or more of monomeric silicon, the silicon oxide, the silicon-carbon complex, the silicon nitrogen complex, or the silicon alloy.

13. The application according to claim 12, wherein the preparation of the positive electrode plate comprising the silicate multi-metal salt comprises: coating at least one surface of a positive electrode current collector with a positive electrode slurry, drying, and compacting, where the positive electrode slurry comprises the positive electrode active substance, the silicate multi-metal salt, a conductive agent, a binder, and a solvent.

14. The application according to claim 12, wherein the preparation of the negative electrode plate comprising the silicate multi-metal salt comprises: coating at least one surface of a negative electrode current collector with a negative electrode slurry, drying, and compacting, where the negative electrode slurry comprises the negative electrode active substance, the silicate multi-metal salt, a conductive agent, a binder, and a solvent.

15. The application according to claim 12, wherein the secondary battery comprises the positive electrode plate, the negative electrode plate, the separator, and the electrolytic solution, wherein the separator is located between the positive electrode plate and the negative electrode plate, the positive electrode plate comprises the positive electrode active material layer, and the negative electrode plate comprises the negative electrode active material layer;

at least one of the positive electrode active material layer and the negative electrode active material layer comprises the silicate multi-metal salt; and when the positive electrode active material layer comprises the silicate multi-metal salt, the positive electrode active material layer comprises the positive electrode active substance and the silicate multi-metal salt;

when the negative electrode active material layer comprises the silicate multi-metal salt, the negative electrode active material layer comprises the negative electrode active substance and the silicate multi-metal salt, where the negative electrode active substance comprises one or more of artificial graphite, natural graphite, soft carbon, hard carbon, or the silicon-based material, and the silicon-based material is selected from one or more of monomeric silicon, the oxide, the silicon-carbon complex, the silicon nitrogen complex, or the silicon alloy; and a chemical formula of the silicate multi-metal salt is at least one selected from $YSi_2Z^1Z^2O_8$ and $X^1X_2Si_2Z^1Z^2O_8$, where Y is selected from second main group elements;

$X^1$ and $X^2$ are each independently selected from first main group elements; and $Z^1$ and $Z^2$ are each selected from third main group elements.

16. The secondary battery according to claim 9, wherein a mass percentage of the graphite in the negative electrode active substance is greater than 50%.

17. The secondary battery according to claim 10, wherein a mass percentage of the silicon-carbon complex in the negative electrode active substance is greater than 50%.

18. The application according to claim 12, wherein the application comprises the preparation of the positive electrode plate comprising the silicate multi-metal salt;

the application comprises the preparation of the negative electrode plate comprising the silicate multi-metal salt; and the application comprises the preparation of the positive electrode plate comprising the silicate multi-metal salt and the preparation of the negative electrode plate comprising the silicate multi-metal salt.

19. The application according to claim 13, wherein in the positive electrode slurry, a mass percentage of the silicate multi-metal salt relative to the positive electrode active substance is selected from 0.001% to 2%;

in the positive electrode slurry, a ratio of a mass of the silicate multi-metal salt relative to a specific surface area of the positive electrode active substance is selected from 0.01 $mg/m^2$ to 100 $mg/m^2$;

a surface density of the silicate multi-metal salt in the positive electrode plate is selected from 0.001 $g/cm^2$ to 0.5 $g/cm^2$.

20. The application according to claim 14, wherein in the negative electrode slurry, a mass percentage of the silicate multi-metal salt relative to the negative electrode active substance is selected from 0.005% to 5%;

in the negative electrode slurry, a ratio of a mass of the silicate multi-metal salt relative to a specific surface area of the negative electrode active substance is selected from 0.01 $mg/m^2$ to 100 $mg/m^2$;

a surface density of the silicate multi-metal salt in the negative electrode plate is selected from 0.001 $g/cm^2$ to 0.5 $g/cm^2$.

* * * * *